(12) United States Patent
Vadrevu et al.

(10) Patent No.: US 11,934,900 B2
(45) Date of Patent: Mar. 19, 2024

(54) TRANSACTION CARD ASSEMBLY

(71) Applicant: Capital One Services, LLC, McLean, VA (US)

(72) Inventors: Vyjayanthi Vadrevu, Pflugerville, TX (US); Phoebe Atkins, Midlothian, VA (US); Michael Saia, Weehawken, NJ (US)

(73) Assignee: Capital One Services, LLC, McLean, VA (US)

( * ) Notice: Subject to any disclaimer, the term of this patent is extended or adjusted under 35 U.S.C. 154(b) by 51 days.

(21) Appl. No.: 17/829,864

(22) Filed: Jun. 1, 2022

(65) Prior Publication Data
US 2023/0169299 A1    Jun. 1, 2023

Related U.S. Application Data

(63) Continuation-in-part of application No. 17/539,636, filed on Dec. 1, 2021, and a continuation-in-part of application No. 17/539,633, filed on Dec. 1, 2021, now Pat. No. 11,868,833.

(51) Int. Cl.
*G06K 19/077* (2006.01)
(52) U.S. Cl.
CPC .............................. *G06K 19/07747* (2013.01)
(58) Field of Classification Search
CPC .................................................. G06K 19/07747
USPC ........................................................ 235/492
See application file for complete search history.

(56) References Cited

U.S. PATENT DOCUMENTS

| | | | |
|---|---|---|---|
| 3,583,317 | A | 6/1971 | Gibson |
| 5,936,227 | A | 8/1999 | Truggelmann et al. |
| 6,087,954 | A | 7/2000 | McSpadden et al. |
| 6,121,544 | A | 9/2000 | Petsinger |
| 6,561,432 | B1 | 5/2003 | Vedder et al. |
| 6,685,097 | B1 | 2/2004 | Housse |
| D490,104 | S | 5/2004 | Lubking |
| 6,767,232 | B1 | 7/2004 | Tien |
| D498,788 | S | 11/2004 | Lubking |
| D511,543 | S | 11/2005 | Lubking |
| 6,964,377 | B1 | 11/2005 | Haghiri et al. |

(Continued)

OTHER PUBLICATIONS

Nadine Salcman "Transparent Credit Card" Rewire Blog https://www.rewire.com/blog/2019//11/06/transparent-credit-card/ pp. 1-3, Nov. 6, 2019.

(Continued)

*Primary Examiner* — Allyson N Trail
(74) *Attorney, Agent, or Firm* — Banner & Witcoff, Ltd.

(57) ABSTRACT

A modular transaction card assembly includes a card frame having the traditional dimensions of a credit card, and a transaction card that is smaller than a traditional card and that fits into a receptacle of the card frame. Each of the card frame and the transaction card may be capable of performing contactless data transactions individually. The combined assembly of the card frame with the transaction card secured in the receptacle is also capable of performing contact data transactions. The transaction card and/or the card frame may include one or more visual or tactile regions that allow the transaction card and card frame to be distinguished from other cards and/or to be properly oriented and aligned with one another when combined to form the card assembly.

20 Claims, 19 Drawing Sheets

(56) References Cited

U.S. PATENT DOCUMENTS

| | | | |
|---|---|---|---|
| 6,986,465 | B2 | 1/2006 | Kiekhaefer |
| D522,052 | S | 5/2006 | Lubking |
| 7,134,603 | B2 | 11/2006 | Batoha |
| 7,384,000 | B2 | 6/2008 | Anders et al. |
| 7,575,153 | B2 | 8/2009 | Wisniewski et al. |
| 7,673,805 | B2 | 3/2010 | Onishi et al. |
| D643,062 | S | 8/2011 | Skelding et al. |
| 8,328,106 | B1 | 12/2012 | Trujillo |
| 8,434,680 | B1 | 5/2013 | Schultz et al. |
| 8,456,852 | B2 | 6/2013 | Xiao et al. |
| 8,573,986 | B2 | 11/2013 | Holmes |
| 9,299,020 | B2 | 3/2016 | Zimmerman et al. |
| 9,754,312 | B2 | 9/2017 | Edwards et al. |
| D835,714 | S | 12/2018 | Bagnell et al. |
| 10,552,722 | B2 | 2/2020 | Finn et al. |
| 10,614,449 | B1 | 4/2020 | Pham et al. |
| 10,675,904 | B2 | 6/2020 | Tiguy et al. |
| 10,817,868 | B1* | 10/2020 | Marsch .............. G06Q 20/352 |
| 10,824,931 | B2 | 11/2020 | Finn et al. |
| 11,030,509 | B1* | 6/2021 | Johnson .............. C08L 99/00 |
| 11,328,195 | B2 | 5/2022 | Montealegre et al. |
| D977,565 | S | 2/2023 | Meraz et al. |
| 11,704,641 | B2 | 7/2023 | Pathiyal |
| 11,755,872 | B2* | 9/2023 | Coleman ........ G06K 19/07722 235/492 |
| 2004/0118930 | A1 | 6/2004 | Berardi et al. |
| 2005/0046175 | A1 | 3/2005 | Fox |
| 2006/0175418 | A1* | 8/2006 | Ho ...................... G06K 19/07 235/492 |
| 2007/0176007 | A1 | 8/2007 | Priya et al. |
| 2007/0194131 | A1 | 8/2007 | Brown et al. |
| 2009/0179077 | A1 | 7/2009 | Brown et al. |
| 2011/0278361 | A1 | 11/2011 | Heusmann et al. |
| 2013/0201646 | A1 | 8/2013 | Braun |
| 2013/0258605 | A1* | 10/2013 | Hsu ...................... H04B 1/3816 248/298.1 |
| 2014/0366753 | A1 | 12/2014 | Meilach et al. |
| 2016/0224879 | A1* | 8/2016 | Amarnath .............. G06K 7/087 |
| 2018/0068138 | A1* | 3/2018 | Palermo ................ G07F 7/0886 |
| 2018/0285868 | A1* | 10/2018 | O'Hara .............. G06Q 20/3276 |
| 2019/0034910 | A1* | 1/2019 | Gardner .............. G06Q 20/341 |
| 2020/0160135 | A1 | 5/2020 | Lowe |
| 2020/0185968 | A1 | 6/2020 | Kim et al. |
| 2020/0311509 | A1 | 10/2020 | Benkley, III et al. |
| 2021/0103919 | A1* | 4/2021 | Mullen .............. G06Q 20/4012 |
| 2021/0110227 | A1 | 4/2021 | Harmon |
| 2021/0182650 | A1 | 6/2021 | Lotya et al. |
| 2021/0279540 | A1 | 9/2021 | Lloyd et al. |
| 2021/0357910 | A1* | 11/2021 | Gupta .................... G06F 21/35 |
| 2022/0134105 | A1 | 5/2022 | Hvals0e et al. |
| 2022/0156711 | A1 | 5/2022 | Pathiyal |
| 2022/0205334 | A1 | 6/2022 | Burke et al. |
| 2022/0291462 | A1 | 9/2022 | Pratap et al. |
| 2022/0400328 | A1 | 12/2022 | Vandenberg et al. |
| 2023/0048029 | A1 | 2/2023 | Brinkerhoff |
| 2023/0086442 | A1* | 3/2023 | Van Ostrand ......... G06F 3/0446 345/173 |

OTHER PUBLICATIONS

"My new credit card is transparent, so you can see the NFC coils and chip bond wires" Reddit Thread https://www.reddit.com/r/mildlyinteresting/comments/5g47ve/my_new_credit_card_is_transparent_so_you_can_see/ website visited Aug. 26, 2021.

* cited by examiner

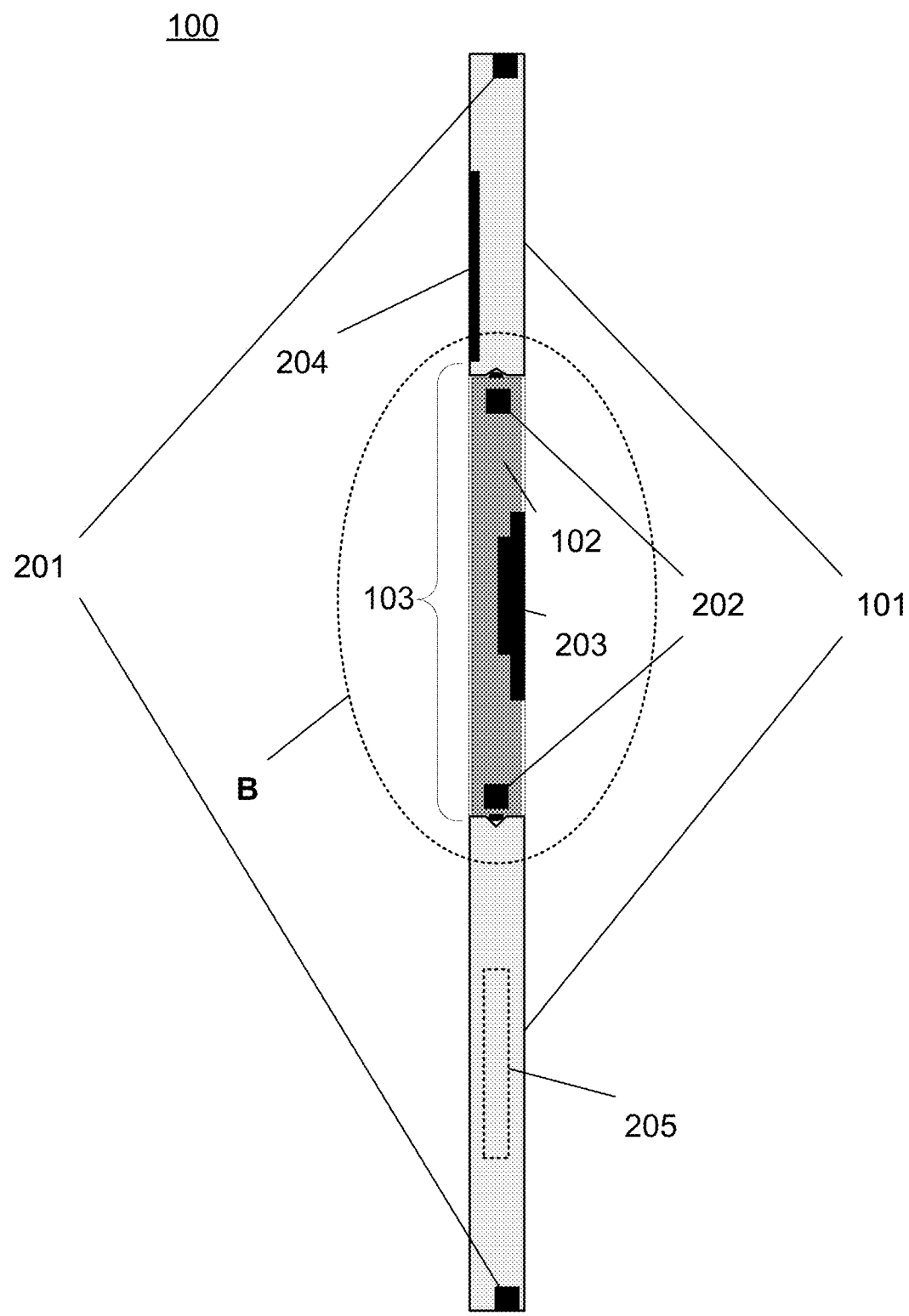
FIG. 2C View A-A

View C

View D

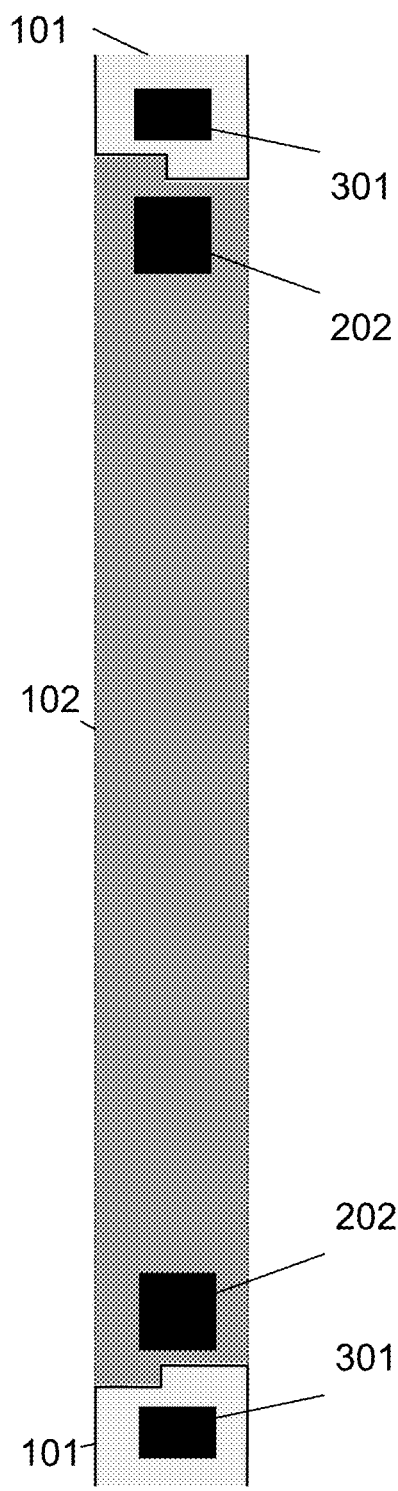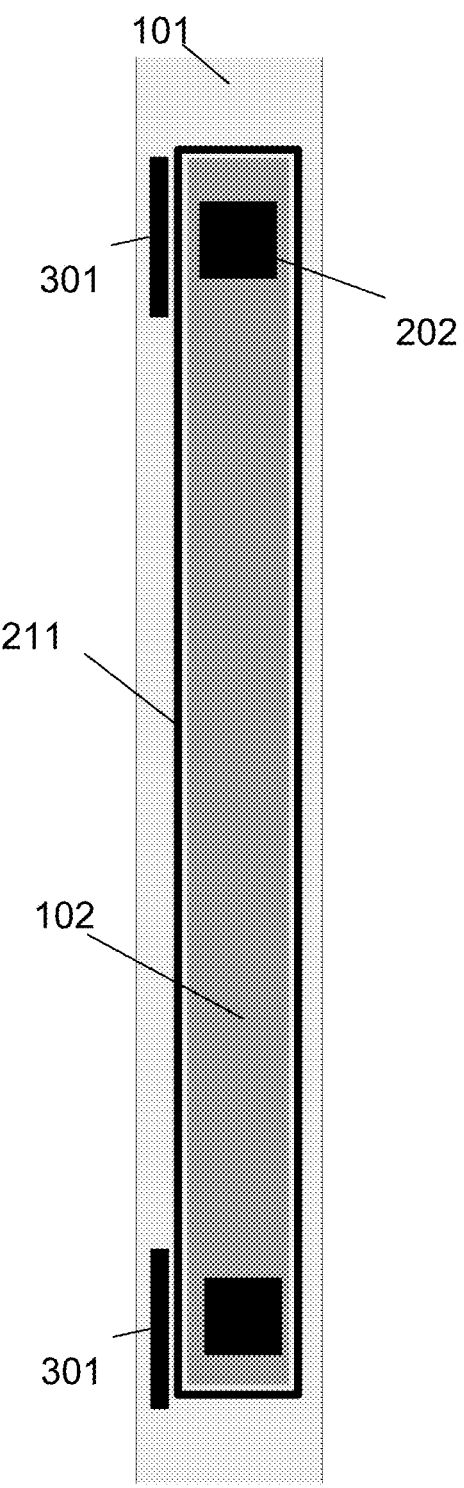
View C - C
Fig. 3C
View C - C
FIG. 3D

TRANSACTION CARD ASSEMBLY

CROSS-REFERENCE TO RELATED APPLICATIONS

This application is a continuation-in-part of U.S. application Ser. No. 17/539,633, filed on Dec. 1, 2021, and a continuation-in-part of U.S. application Ser. No. 17/539,636, filed on Dec. 1, 2021, each of which is hereby incorporated by reference in its entirety.

FIELD OF USE

Aspects of the disclosure relate generally to transaction cards and more specifically to a modular transaction card having multiple form factors. Aspects of the disclosure also relate to visual and/or tactical features included on a transaction card or corresponding card frame to aid alignment and insertion of the transaction card into the card frame

BACKGROUND

Transaction cards have different form factors with different capabilities. Traditional credit cards, for example, may perform transactions contactlessly, using a magnetic strip, or via a smart chip. Transaction cards in smaller form factors, such as ones with a hole punch that can be attached to a keychain, are often more convenient to carry and may have the same transaction features, but not all card readers are able to work with the smaller dimensions.

Further, transaction cards having smaller form factors may be challenging for a user to locate, manipulate, and/or use with other systems in order to extend the capabilities of the transaction cards.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

The methods, devices, systems, and/or computer-readable media disclosed herein relate to a transaction card assembly that includes a card frame having the traditional dimensions of a credit card, and a transaction card that is smaller than a traditional credit card (e.g., a "mini" transaction card). The transaction card may be capable of performing contactless data transactions (for example, credit card purchases) on its own via wireless communications, but may not be compatible with certain card readers, such as a chip reader, which accepts only a traditional credit card format. The card frame includes a receptacle that accepts and secures the transaction card and couples it to an antenna in the card frame, permitting the combined card frame and transaction card assembly to perform data transactions as a traditional form factor transaction card.

The receptacle in the card frame may have electrical contacts that mate with electrical contacts on the transaction card to couple it to the card frame antenna. In some variations, the card frame may have a second antenna that wirelessly communicates with an antenna in the transaction card when it is secured in the receptacle.

The card frame may include other features, such as electronics to provide power to the transaction card in the receptacle and may include shielding to prevent the antenna in the transaction card and the antenna in the card frame from both communicating with a card reader simultaneously.

In some variations, the card frame comprises a processing circuit for implementing a smart card frame. The processing circuit may include a computing device and memory storing computer instructions for enabling the card frame to work on its own as a transaction card without the smaller transaction card in the receptacle. The computing device may further implement authentication and cryptographic functions. For example, the card frame may authenticate the transaction card in the receptacle as a condition for completing a data transaction. The card frame may be used with multiple different transaction cards, with each combination of the card frame and different transaction cards having a unique identifier that is distinct from the identifier of each transaction card alone and different from the identifier of the card frame alone.

Methods, devices, and systems disclosed herein also provide features or characteristics on the transaction card and/or the card frame that allow a user to quickly locate and distinguish the transaction card and the card frame, and to orient and insert the transaction card into the card frame in a correct or intended manner. The features or characteristics may include visual and/or tactile features to aid a user's interaction with the transaction card and the card frame. The visual and/or tactile features may be advantageous to any individual including visually, impaired, or blind individuals.

These features, along with many others, are discussed in greater detail below.

DESCRIPTION OF THE DRAWINGS

The present disclosure is described by way of example and not limited in the accompanying figures in which like reference numerals indicate similar elements and in which:

FIGS. 2A-2H illustrate multiple views of a transaction card assembly in accordance with one or more aspects of the disclosure;

FIGS. 3A-3D illustrate multiple views of a transaction card assembly device in accordance with one or more aspects of the disclosure;

DETAILED DESCRIPTION

Figure 1:
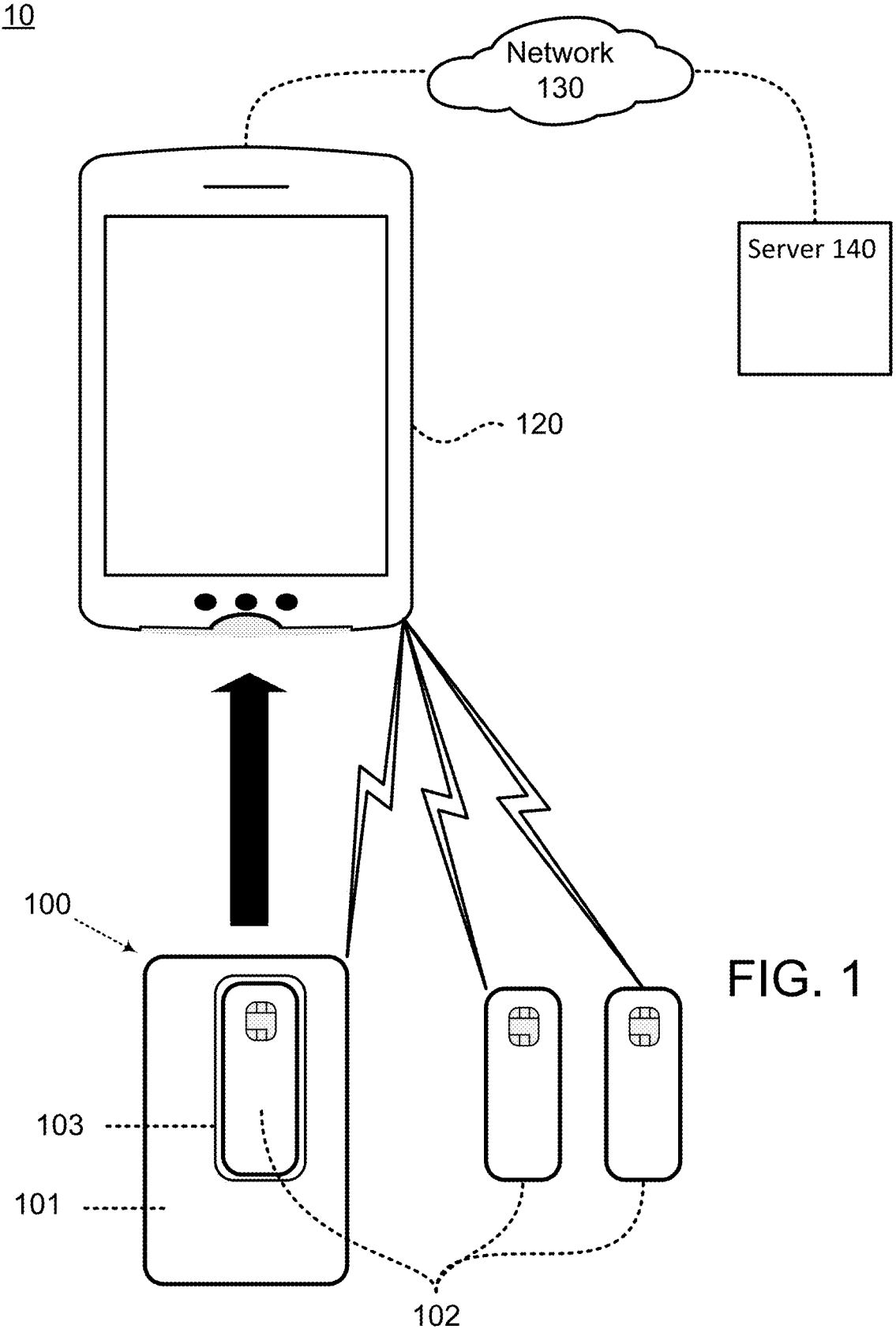
FIG. 1 illustrates a system in which a transaction card assembly may be used in accordance with one or more aspects of the disclosure.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems and methods and techniques for a card assembly that includes a card frame and a transaction card (e.g., mini credit cards) that may be combined together to perform contactless data transactions. The transaction card may include an integrated circuit, a first plurality of contacts, and a first antenna. The card frame may include a second antenna, a second plurality of contacts, and a receptacle designed to secure, enable removal of, and resecure the transaction card in the card frame. While the transaction card is secured in the receptacle, the first plurality of contacts are positioned to touch the second plurality of contacts to connect the integrated circuit in the transaction card to the second antenna in the card frame. When the transaction card is not secured in the receptacle, the integrated circuit in the transaction card may be configured to perform a first contactless data transaction with a terminal via the first antenna in the transaction card. And when the transaction card is secured in the receptacle, the integrated circuit in the transaction card may be configured to use the second antenna in the card frame to perform a second contactless data transaction with the terminal.

By way of further introduction, aspects discussed herein may relate to systems, methods, and techniques for a card assembly that includes a card frame and a transaction card (e.g., mini credit card) that may include one or more features or characteristics that allow a user to distinguish the card frame and the transaction card from one another and from other cards or items, and allow the user to orient, align, and/or secure the transaction card within the card frame in a proper manner. The transaction card may include an integrated circuit and a first alignment region. The card frame may include a receptacle and a second alignment region. The receptacle is configured to secure, enable removal of, and resecure the transaction card in the card frame. The first and second alignment regions may include one or more visual and/or tactile features. When the transaction card is secured in the receptacle, the first alignment region is aligned with the second alignment region to indicate a correct orientation of the transaction card with the card frame. When properly oriented, the first alignment region and the second alignment region may form a combined alignment indicator or region. The combined alignment indicator provides feedback to the user to specify that the transaction card is properly oriented and secured in the card frame.

FIG. 1 illustrates a system 10 that illustrates several components that may be found when conducting a transaction with different types of transaction cards. For example, system 10 shows a card reader 120 (e.g., a point-of-sale terminal), that may exchange data with transaction cards (e.g., 102) through a plurality of communication techniques. The card reader 120 may be communicatively coupled to a server 140 via network 130.

Card reader 120 may be any suitable card reader capable of exchanging data and/or information with transaction cards 102. In this regard, card reader 120 may be a chip-based reader, a magnetic-based reader, an EMV reader, a wireless based reader, or any combination thereof. Accordingly, card reader 120 may include a display, a keypad, a network interface and a card interface. The display may present information to the cardholder, such as the amount owed, the status of the transaction, and whether the transaction has been approved or denied. A keypad or touch screen may allow a cardholder to input a personal identification number (PIN) code, password, an amount for withdrawal, and the like. A network interface may be a wired connection, wireless connection, a short-range wireless connection, a near field communication (NFC) connection, or any combination thereof. The network interface may permit card reader 120 to communicate with server 140, via network 130, for example, to authorize a transaction. The card interface may permit card reader 120 to communicate with transaction cards 102. In these instances, card reader 120 may convey information related to the cardholder's account to transaction cards 102. Card reader 120 may be limited in the ways it can communicate with different types of transaction cards. For example, card reader 120 may have a transaction card chip reader that only works with the dimensions of a standard size credit card, but not with the dimensions of transaction card 102, which in some instances, may have smaller or non-standard dimensions (e.g., a mini-card connectable to a key ring).

Various aspects described herein, which address this compatibility issue, are directed to a card assembly 100 comprising a card frame 101 that secures a smaller transaction card 102 in a receptacle 103. In some embodiments, the card assembly 100 performs data transactions with card readers not compatible with transaction card 102, and optionally, with a unique identifier that is distinct from an identifier of transaction card 102 when the transaction card is not secured in the card frame 101.

Server 140 may be a stand-alone server, a corporate server, or a server located in a server farm or cloud-computer environment. According to some examples, server 140 may be a virtual server hosted on hardware capable of supporting a plurality of virtual servers. Server 140 may be configured to execute server-based software configured to provide cardholders with access to account information and perform routing banking functions. In some embodiments, the server-based software corresponds to client-based software executing on card reader 120.

Network 130 may be any type of communications and/or computer network. The network 130 may include any type of communication mediums and/or may be based on any type of communication standards or protocols. In this regard, network 130 may include the Internet, a local area network (LAN), a wide area network (WAN), a wireless telecommunications network, and/or any other communication network or combination thereof.

Figure 7:
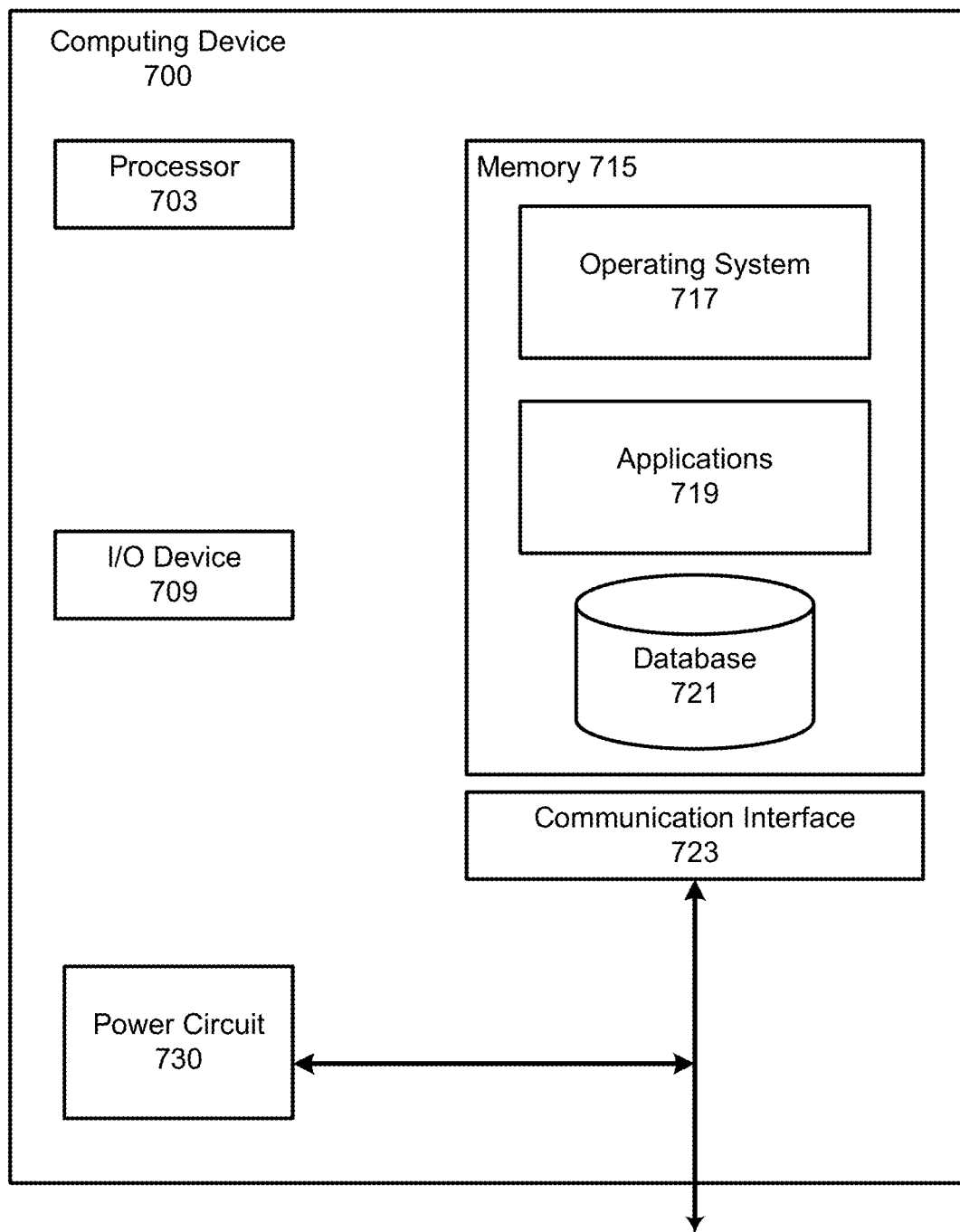
FIG. 7 illustrates a block diagram of a processing circuit according to one or more aspects of the disclosure.

Devices and systems 120, 130, and 140 in FIG. 1 may be implemented, in whole or in part, using one or more computing systems, for example, as described below with respect to FIG. 7.

Transaction card 102 and card frame 101, individually or combined as card assembly 100, may be configured to permit a cardholder to access one or more types of accounts. In this regard, transaction card 102, card frame 101, and/or card assembly 100 may behave as a credit card, a charge card, a debit card, a prepaid card, a smartcard, a payment card or an EMV card. In some embodiments, transaction card 102, card frame 101, and/or card assembly 100 may be an identification card, a club membership card, a rail pass card, or a building access card. As will be discussed in greater detail with respect to FIGS. 2 and 3, transaction card 102, card frame 101, and/or card assembly 100 may be chip-enabled and/or may include a magnetic strip. In further embodiments, transaction card 102, card frame 101, and/or card assembly 100 may include NFC capabilities, short-range wireless communication capabilities (e.g., Bluetooth®), wireless communication capabilities (e.g., Wi-Fi), or any combination thereof. The NFC capabilities, short-range wireless communication capabilities, and wireless communication capabilities may be referred to collectively as communication capabilities. These communication capabilities may permit transaction card 102, card frame 101, and/or card assembly 100 to communicate with card reader 120.

Figure 2A:
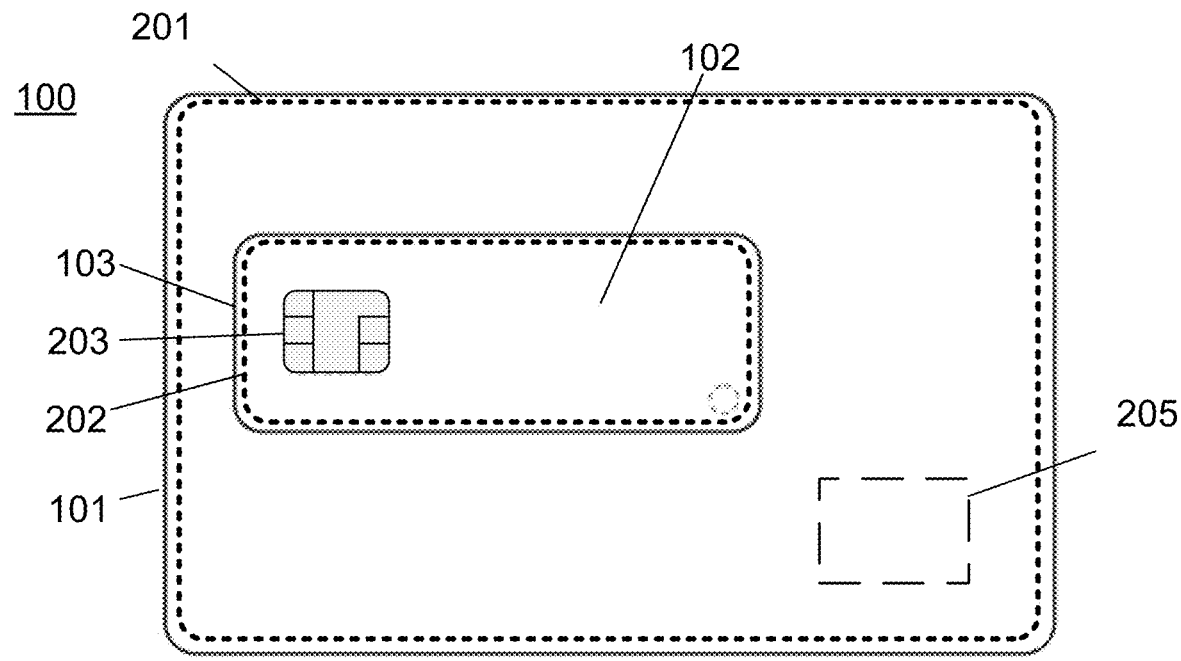
Figure 2B:
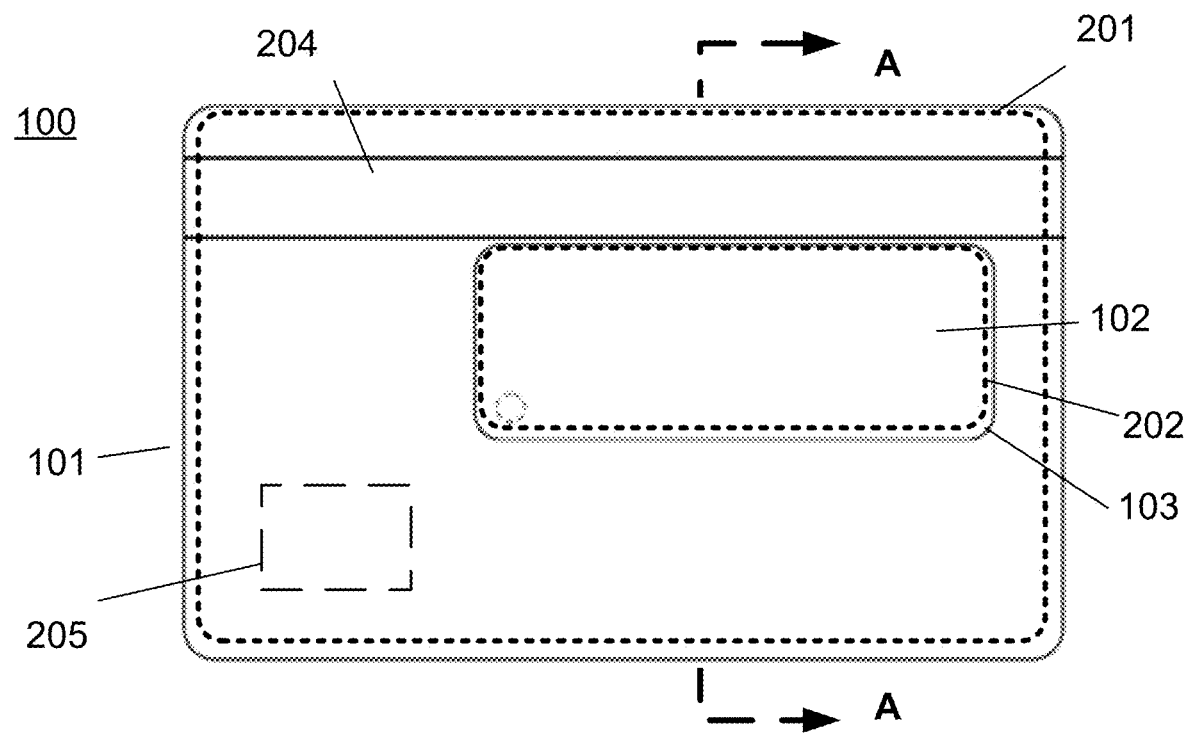

Turning to FIG. 2A-2H, various views of card assembly 100 are illustrated. As illustrated in FIGS. 2A and 2B illustrating front and back views, card frame 101 of card assembly 100 may be of a standard size and made of a suitable substrate, such as plastic, metal, etc. For example, card frame 101 may be formed as a flat sheet having a rounded rectangle perimeter. In some variations, the flat sheet is 3.361 to 3.382 inches wide, 2.119 to 2.133 inches high, and 0.027 to 0.033 inches thick.

Card frame 101 may include a magnetic strip 204 for storing data (e.g., credit card information) that may be read and written to by card reader 120, and may include an antenna 201 capable of wireless communications (e.g., NFC, Bluetooth, Wi-Fi) with another device, such as card reader 120 in FIG. 1.

Receptacle 103 in card frame 101 may be configured to secure, permit removal of, and resecure transaction card 102. Card frame 101 may further include an electric circuit 205 for interfacing transaction card 102 to card frame antenna 201, when transaction card 102 is secured in the receptacle 103. Details of electric circuit 205 are further described below with respect to FIGS. 4 and 7.

Transaction card 102 may include a computer chip 203 and its own antenna 202 capable of wireless communications (e.g., NFC, Bluetooth, Wi-Fi) with another device, such as carder reader 120 in FIG. 1. As illustrated in the figures, antenna 202 and computer chip 203 may be embedded within transaction card 102, and may be located anywhere in the perimeter of the transaction card 102 as illustrated in FIGS. 2A and 2B, and at any depth or on either surface of the transaction card 102.

FIG. 2C illustrates a cross-sectional view A-A of FIG. 2B. As illustrated in FIG. 2C, the magnetic strip 204 may be embedded in, or on the surface of one side of, card frame 101, enabling it to be read by a magnetic strip card reader. Antenna 201 and electric circuit 205 may also be embedded in, or on the surface of one side of card frame 101. As illustrated in FIGS. 2A-2C, antenna 201 may be integrated along the perimeter of card frame 101. In some variations, card frame 101 comprises a flat metal sheet and the antenna 201 is insulated from the metal sheet. In further variations, the antenna 201 is exposed along the edge of the card frame or is not completely surrounded by the metal sheet, so that the metal sheet does not interfere with reception and transmission of radio frequency communications by the antenna 201.

The locations of magnetic strip 204, antenna 201, and electric circuit 205 are not limited to those locations illustrated in the figures and may be located anywhere in the perimeter of the card frame 101 illustrated in FIGS. 2A and 2B, and at any depth or on either surface of the card frame 101 illustrated in FIG. 2C.

As illustrated in FIGS. 2A-2C, in some variations transaction card 102, when secured in receptacle 103, may be substantially within the outer dimensions of card frame 101, such that card frame 101 and transaction card 102 together form card assembly 100 as a uniform piece that appears and functions as a traditional transaction card (e.g., credit card).

Computer chip 203 in transaction card 102 may be a smart chip or integrated circuit. In this regard, chip 203 may include a microprocessor and memory, such as read only memory (ROM) and/or random access memory (RAM). Additionally, chip 203 may include one or more contact pads (illustrated in FIG. 2A) to receive electric power to operate the transaction card 102 and exchange signals with a terminal, such as card reader 120. In some instances, the chip 203 may be configured to execute one or more applications. The applications may allow chip 203 to process payments. In other examples, the applications may allow the chip 203 to perform cryptographic processing, authentication, define risk management parameters (e.g., when the transaction may be conducted offline), digitally sign payment data, and/or verify the cardholder. When secured in the receptacle 103 of the card frame 101, the contact pads of chip 203 may be positioned to appear as contact pads for the card frame 101. In some variations, transaction card 102 may be configured to perform a first transaction (e.g., a data transaction via chip 203 and/or antenna 202 authenticated with a first set of credentials) when the transaction card 102 is not inserted into card frame 101, and perform a second transaction (e.g., a data transaction via chip 203 and/or antenna 201 authenticated with a second set of credentials) when the transaction card 102 is inserted into card frame 101.

Figure 2D:
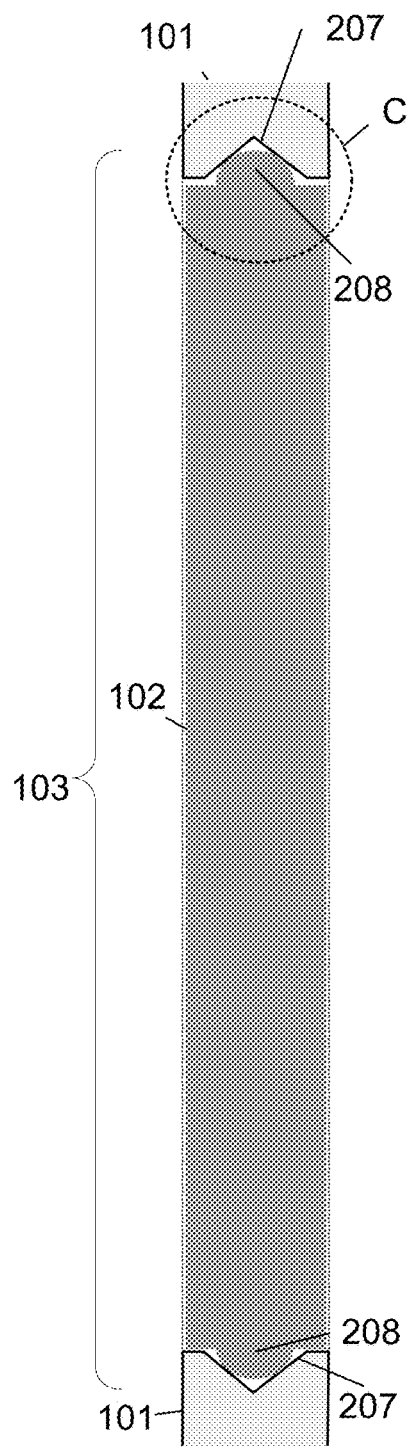
Figure 2E:
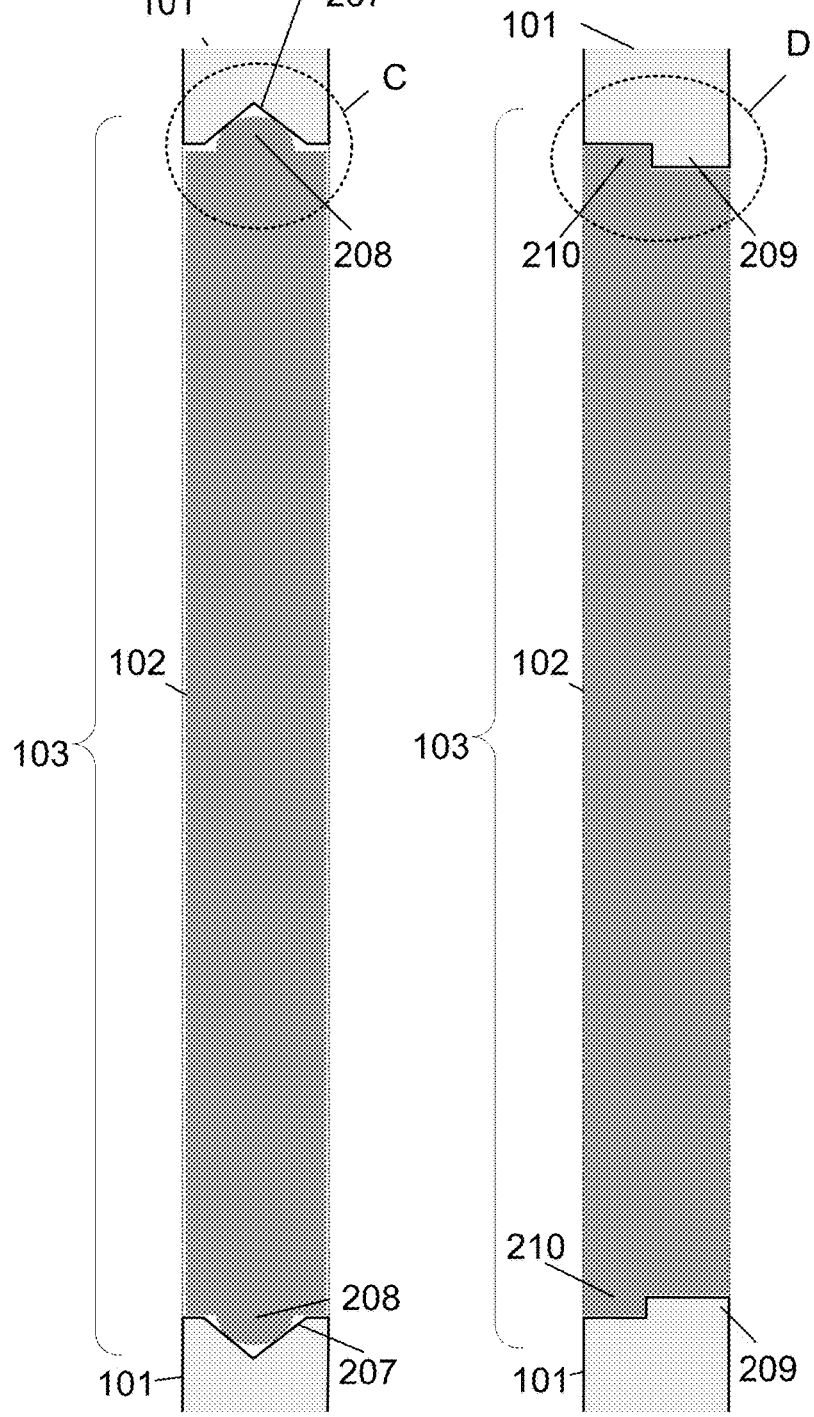
Figure 2F:
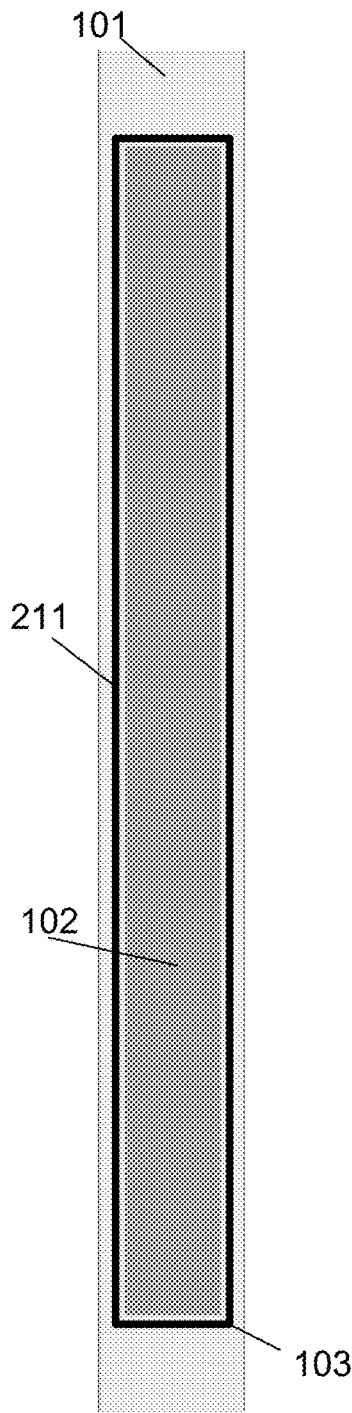

FIGS. 2D-2F illustrate various examples of view B of FIG. 2C to show in more detail the transaction card 102 inserted in receptacle 103. As illustrated in FIGS. 2D and 2E, card frame 101 may be a flat sheet comprising two opposing surfaces separated by a thickness and bounded by a perimeter (illustrated in FIGS. 1A and 1B), wherein the receptacle 103 comprises a hole passing completely through the thickness of the flat sheet. The receptacle 103 may have a perimeter (as illustrated in FIGS. 2A and 2B) that matches entirely, or only at some edges of, the perimeter of the transaction card 102. As illustrated in FIG. 2D, the transaction card 102 and receptacle 103 may have an interference fit in which the profile of the transaction card 102 has a protrusion 208, which fits within a groove 207 of the receptacle 103 to secure the transaction card 102 in the card frame 101. The material of the protrusion 208 and/or the walls of the groove 207 may be flexible to allow the transaction card 102 to be secured, removed, and resecured in the receptacle 103 with the application of opposing forces perpendicular to the faces of the card frame 101 and transaction card 102 respectively, for example, to snap the transaction card 102 into the receptacle 103. While protrusion 208 is illustrated as curved and groove 2007 is illustrated in the shape of a "v," these may be of any profile that provides an interference fit. Additionally, the profiles may be reversed so that the perimeter of the transaction card 102 has a groove, and the receptacle 103 has a protrusion.

FIG. 2E illustrates another example, in which the perimeters of the receptacle 103 and transaction card 102 have mating rims 210 and 209 respectively with mirrored profiles. In some variations, the transaction card 102 may be inserted from only one side of the card frame 101. The transaction card 102 may be secured in the receptacle 103 by friction between the perimeters of the transaction card 102 and receptacle 103. In other variations, the transaction card 102 may be magnetically coupled to the receptacle 103 and/or card frame 101 to secure, enable removal of, and resecure the transaction card 102 in the card frame 101. Each of these configurations can be used together, for example by some edges of the transaction card 102 being secured with a groove/protrusion, and some with mirrored rims that are coupled magnetically. Transaction card 102 may be configured to detect whether it is inserted in the card frame 101, and based on this detection, perform different operations (e.g., perform different types of data transactions or take on different identities).

While FIGS. 2D and 2E illustrate the receptacle 103 as a hole passing completely through the flat sheet of the card frame, in other variations, the receptacle 103 may be a recess in one of the two opposing surfaces with the other surface being completely or partially closed.

FIG. 2F illustrates another variation of receptacle 103 comprising a slot 211 having an open end, along the perimeter between the two opposing surfaces of the card frame 101, through which the receptacle 103 is configured to secure, enable the removal of, and resecure the transaction card 102.

In some variations, the card frame 101 and/or receptacle 103 may provide an electromagnetic shield preventing the antenna 202 in the transaction card 102 from receiving or transmitting radio frequency signals while the transaction card 102 is secured in the receptacle 103. For example, in the receptacle 103 in FIG. 2F, one or both surfaces of the card frame 101 may be coated or made of a conductive material (e.g., aluminum, stainless steel, titanium), which covers the transaction card 102 partially or completely. In this way, the card frame 101 may disable the transaction card antenna 202 while the transaction card 102 is secured in the receptacle 103, thus preventing both antennas 201 and 202 from relaying data transactions simultaneously. Alternatively or additionally, transaction card 102 may disable its antenna 202 based on detecting that the transaction card 102 is secured in the receptacle 103.

Figure 2G:
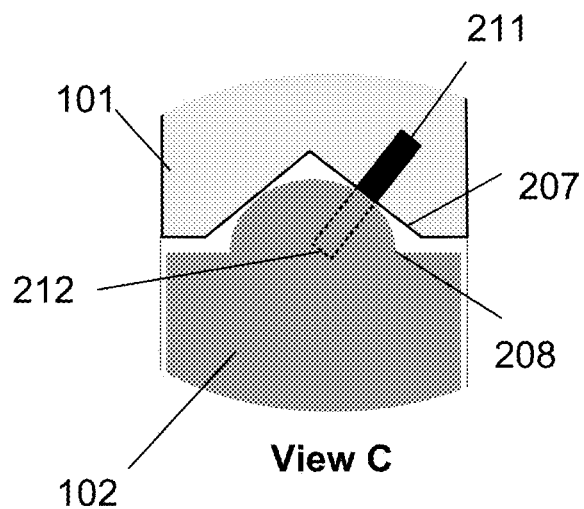
Figure 2H:
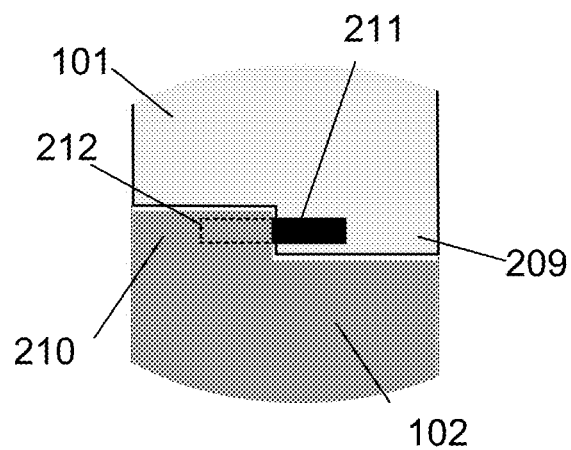

As previously discussed, when transaction card 102 is secured in receptacle 103, it may be interfaced to antenna 201 in the card frame 101 via electric circuit 205. FIGS. 2G-2H illustrate views C and D of FIGS. 2D-2E, respectively, which illustrate details of electrical contacts for electrically coupling transaction card 102 to electric circuit 205. As illustrated in these figures, card frame 101 may include one or more electrical contacts 211 along the perimeter of the receptacle 103 that contact a corresponding one or more electrical contacts 212 on the perimeter of the transaction card 102 when the transaction card 102 is secured in the receptacle 103. In FIG. 2G, contacts 211 and 212 are illustrated on the mating protrusion 208 and groove 207, respectively, but the contact coupling can be positioned at any location at which the transaction card 102 comes into contact with the card frame 101 so that contacts 211 and 212 touch. Similarly, in FIG. 2H, contacts 211 and 212 are illustrated on the first rim of card frame 101 and mating second rim of transaction card 102, respectively, but the contact coupling can be positioned at any location at which the transaction card 102 comes into contact with the card frame 101 so that contacts 211 and 212 touch. For example, if the receptacle 103 is a recess or a slot, the card frame 101 may have contacts on the bottom surface of the recess or inside surface of the slot, which contact corresponding contacts on a surface of the transaction card 102.

Figure 3A:
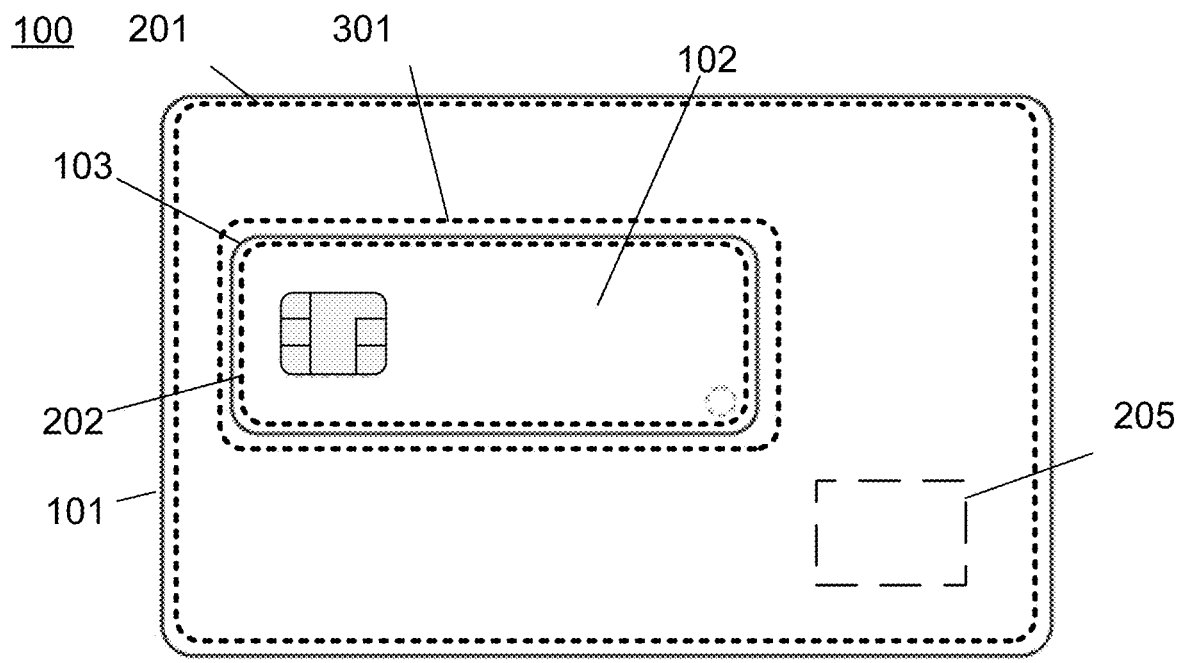
Figure 3B:
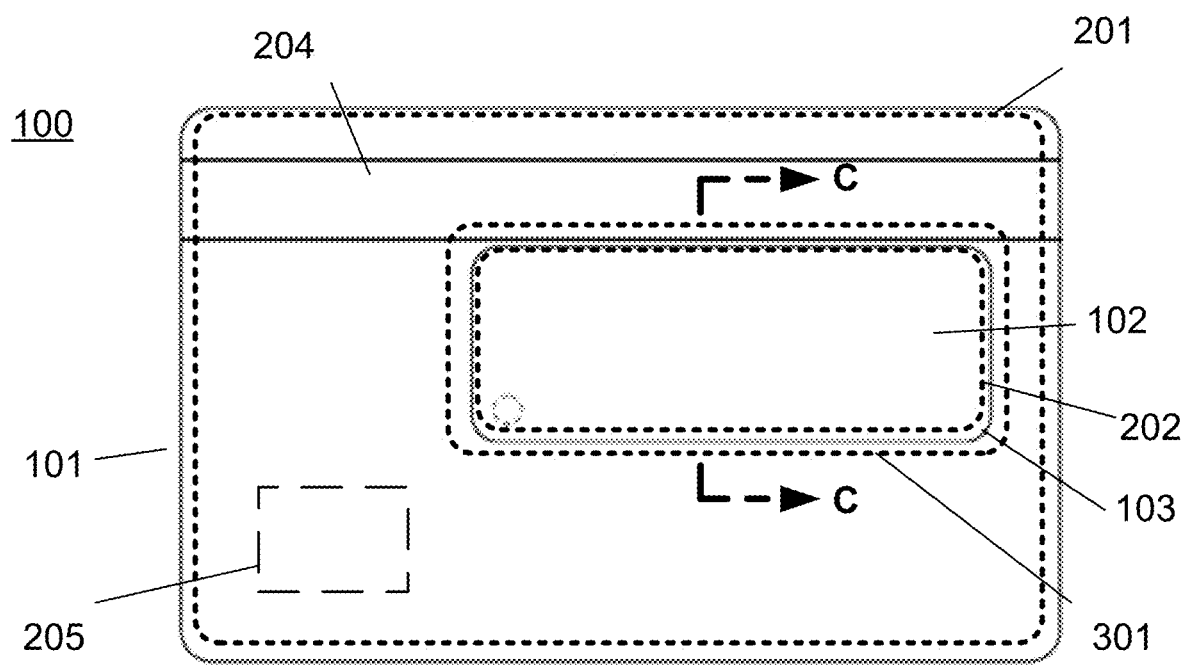

FIGS. 3A-3D illustrate different views of another variation of card assembly 100, in which card frame 101 communicates with transaction card 102 wirelessly (e.g., without using contacts 211 and 212). FIG. 3A illustrates a front view, FIG. 3B illustrates a back view, and FIGS. 3C and 3D illustrate cross-section views C-C of receptacle 300. As illustrated in these figures, card frame 101 includes an additional antenna 301 proximate to the receptacle 103. For example, as illustrated in FIGS. 3A, 3B, and 3C, antenna 301 may be embedded in the card frame 101 and may encircle the perimeter of the receptacle 103, and thus encircle antenna 202 when the transaction card 102 is secured in the receptacle 103. In other variations, for example when the receptacle 103 comprises a recess or a slot as illustrated in FIG. 3D, antenna 301 may be embedded in or on the surface of the wall of the slot or on the bottom of a recess. In this assembly, transaction card 102 and card frame 101 exchange data via radio frequency communication between antennas 202 and 301, which may include implementing a wireless protocol (e.g., NFC, Wi-Fi, Bluetooth®, and/or Bluetooth Low Energy (BLE)). In some variations, antennas 301 and 202 provide inductive power transfer between card frame 101 and transaction card 102. In some variations the card frame 101 includes both electrical contacts 211 and antenna 301, which may alternatively be used, or used in combination, depending upon whether the transaction card 102 has corresponding features and capabilities (e.g., contacts 212 and antenna 202).

Transaction card 102 may be coupled to antenna 201 in the card frame by electric circuit 205 via the electrical contacts 211 and 212 or by the electromagnetically coupled antennas 202 and 301. In one variation, electric circuit 205 may comprise wire conductors and (optionally) passive components (e.g., capacitors, resistors, inductors) that electrically (e.g., directly or capacitively) connect antenna 201 to contacts 211 and/or antenna 301.

Figure 4:
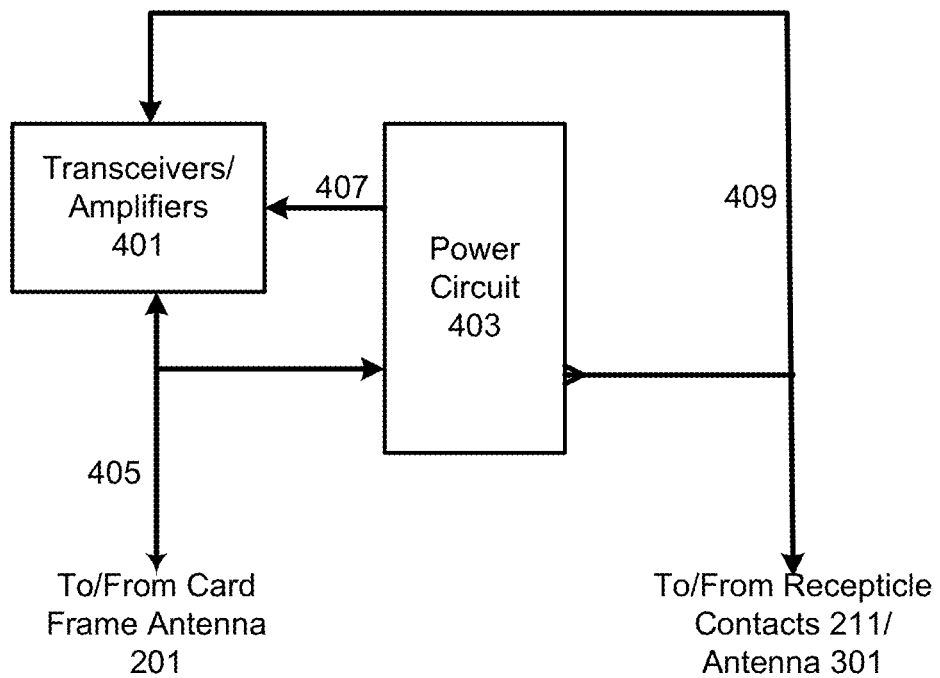
FIG. 4 illustrates a block diagram of an electrical circuit according to one or more aspects of the disclosure.

FIG. 4 illustrates circuit 400, which is another variation of electric circuit 205. Circuit 400 may include one or more conductors 405 that are connected between antenna 201 and transceivers and/or amplifiers 401 in card frame 101. Antenna 201 may receive and radiate radio frequency signals, which correspond to signals carried on the one or more conductors 405 to and from transceivers and/or amplifiers 401. Similarly, one or more conductors 409 are connected and carry electrical signals between contacts 211 or antenna 301 and transceivers and/or amplifiers 401. The transceivers and/or amplifiers 401 condition the signals, for example by amplifying and filtering them, and exchange the conditioned signals between conductors 405 and 409 to provide a complete communication path for data carried in the signals between the antenna 201 in the card frame and the transaction card 102 in the receptacle 103.

For example, the electric circuit 400 may be configured to receive, via contacts 211 and conductors 409, a first signal comprising transmission data from the transaction card 102 (through contacts 212), amplify the first signal with transceivers and/or amplifiers 401 to generate an amplified first signal, and transmit wirelessly the amplified first signal including the transmission data via conductors 405 and antenna 201. Similarly, the electric circuit 400 may be configured to receive wirelessly, via antenna 201 and conductors 405, a second signal comprising reception data, amplify the second signal to generate an amplified second signal with transceivers and/or amplifiers 401; and transmit the amplified second signal including the reception data, to the transaction card 102 via conductors 409 and contacts 211. This relaying of data between the antenna 201 in the card frame 101 and the transaction card 102 in the receptacle 103, and wirelessly transceiving the data between the antenna 201 and a terminal may be used to perform a contactless data transaction between the transaction card 102 and a terminal. In some variations, transceivers and/or amplifiers 401 may include communication protocol capabilities, such as NFC, Wi-Fi, Bluetooth®, and/or BLE.

Electric circuit 400 may further include a power circuit 403, which is configured to generate electric power from signals from antenna 201 in the card frame 101. For example, radio frequency electromagnetic energy (e.g., radio frequency wireless signals) may be received by antenna 201 and conducted along conductors 405 to power circuit 403. These may be the same or different signals that carry data and are conditioned and amplified by transceivers/amplifiers 401. Power circuit 403 may include a power converter (for example, comprising a capacitor and a diode) that converts the radio frequency signals to electrical power (e.g., alternating current or direct current power). The generated electrical power may be provided via conductors 407 to energize the electrical circuits within the transceivers and/or amplifiers 401. The electrical power may additionally or alternatively be provided via conductors 409 to contacts 211 and 212 to the transaction card 102. In some variations, the electrical power is converted back to radio-frequency signals and transmitted via antenna 301 to the transaction card 102, which may be configured to receive these signals via antenna 202 and convert them to electrical power internally in the transaction card 102 (e.g., inductive charging).

Figure 5:
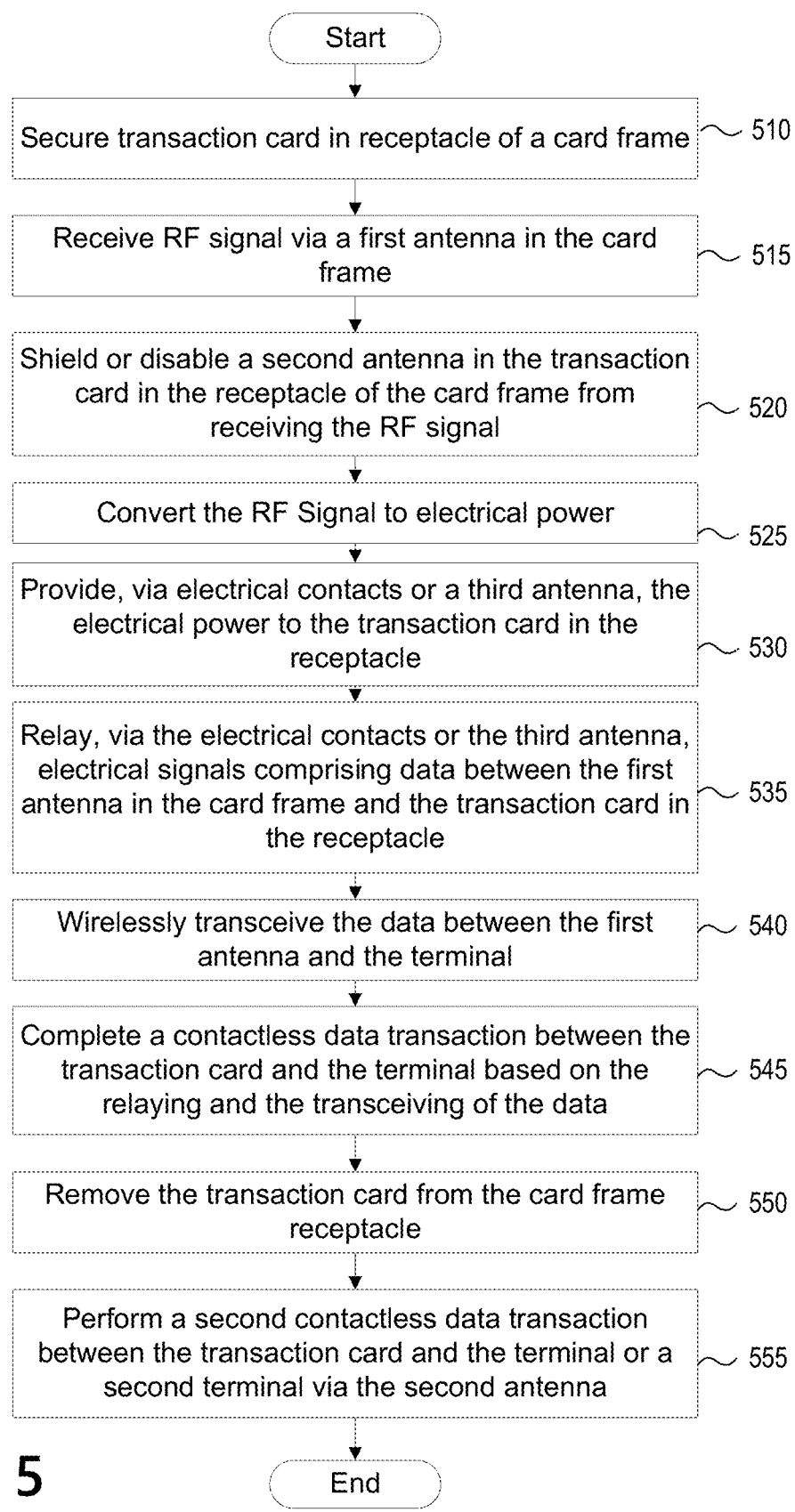
FIG. 5 illustrates a first example method for using a transaction card assembly to perform a data transaction according to one or more aspects of the disclosure.

FIG. 5 illustrates an example method 500 for using the transaction card 102 with and optionally without card frame 101. In step 510, transaction card 102 may be secured in receptacle 103 of card frame 101 as described above (e.g., with an interference fit or magnetic coupling). In step 515, radio frequency electromagnetic energy (e.g., a wireless radio frequency signal) may be received via antenna 201.

In step 520, second antenna 202 in the transaction card 102 is disabled from receiving radio frequency signals from outside of the card frame 101. In some examples, this prevents the card assembly 100 (101 and 102 together) from performing or attempting to perform multiple transactions with a card reader (e.g., a point-of-sale terminal), by for example, receiving radio frequency transmission on both antenna 201 and 202. In some variations (for example, as shown in FIG. 2F and described above), antenna 202 is disabled by the card frame 101 by providing an electromagnetic shield around the antenna 202. In other variations, the transaction card 102 detects that it is secured in the receptacle 102, and based on this detection, disables the antenna 202 internally in the transaction card 102.

In step 525, the card frame 101 converts the received radio frequency signals into electrical power (e.g., direct-current or alternating-current power), and in step 530, the electrical power is provided via electrical contacts 211/212 or antennas 301 and 202 (via inductive coupling) to the transaction card 102 in the receptacle 103 as discussed above.

In step 535, the card frame 101 may relay, via the electrical contacts 211 and 212 or antennas 301 and 202, electrical signals comprising data between antenna 201 in the card frame 101 and the transaction card 102 in the receptacle 103. This may be performed by electric circuit 400 as previously discussed, or by computing device 700, which is further described below with respect to FIG. 7. In step 540, card frame 101 may wirelessly transceive this data to and from a card reader 120 (e.g., a terminal). The transceiving may include radiating and/or receiving the data in radio frequency signals from antenna 201. In step 545, the card assembly 100 completes a contactless data transaction between the transaction card 102 and the terminal based on the relaying and the transceiving of the data.

In step 550, the transaction card 102 is removed from the card frame receptacle 103, as previously described above. Once removed, in step 550, the transaction card 102 may perform a second contactless data transaction with the card reader (or a different card reader) (e.g., terminal) using its antenna 202. The steps of process 500 may be performed in other orders and all steps need not be performed.

Figure 6:
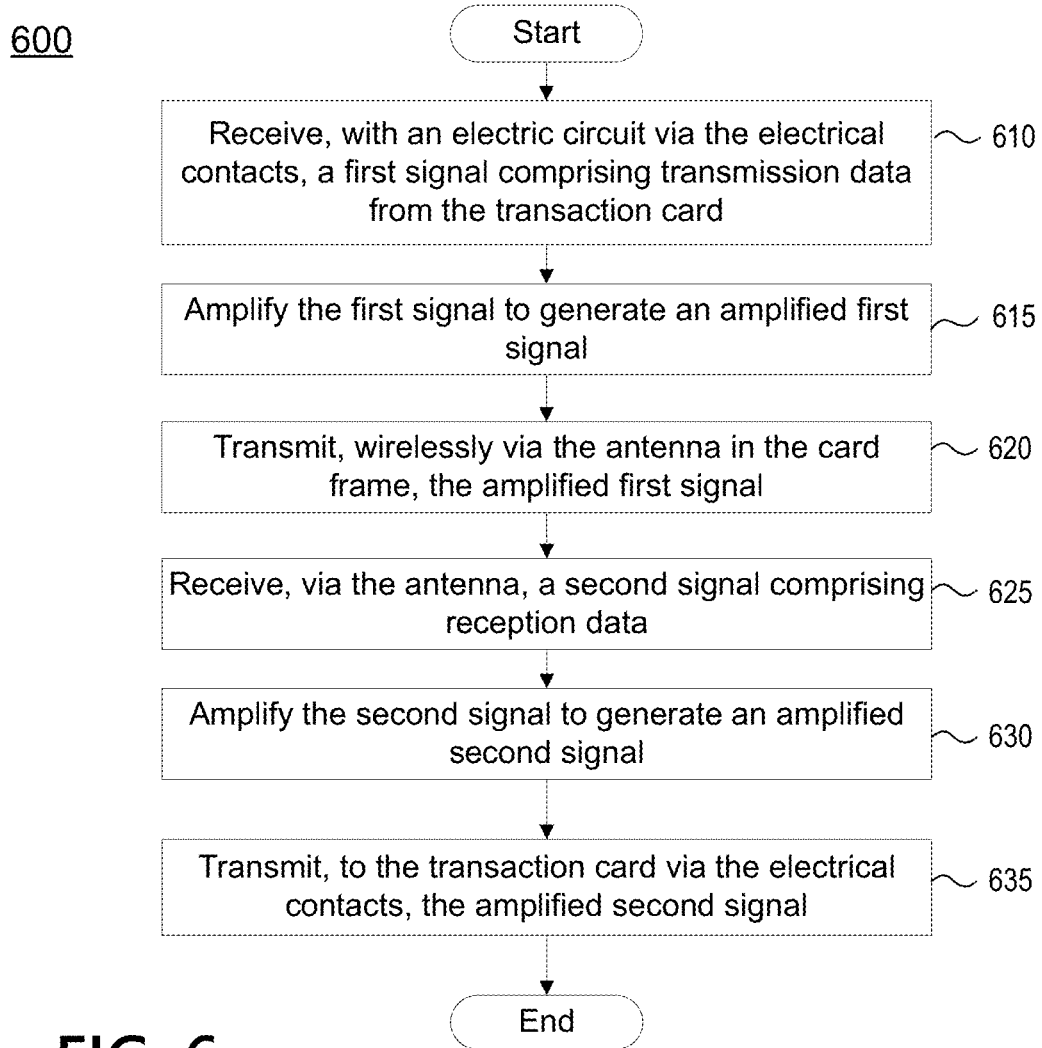
FIG. 6 illustrates a second example method for using a transaction card assembly to perform a data transaction according to one or more aspects of the disclosure.

FIG. 6 illustrates a method 600 for card frame 101, for example using electric circuit 400, to relay and transceive data. In step 610, the card frame 101 may receive (for example via the electrical contacts 211 or antenna 301) a first signal comprising transmission data from the transaction card 102. In step 615, the card frame 101 may amplify (for example using transceivers and/or amplifiers 401) the first signal to generate an amplified first signal. In step 620, the card frame 101 may transmit, wirelessly via antenna 201, the amplified first signal, for example to a card reader 120. In step 625, the card frame 101 may receive, via antenna 201, a second signal comprising reception data, and in step 630, the card frame 101 may amplify (for example using transceivers and/or amplifiers 401) the second signal to generate an amplified second signal. In step 635 the card frame 101 may transmit (for example via the electrical contacts 211 or antenna 301) the amplified second signal to the transaction card 102. The transmission of the first signal comprising transmission data and the reception of the second signal comprising reception data may be performed in any order and may be related, with one being based on, or in response to, the other, and with both part of a contactless data transaction (e.g., a credit card transaction). Processes 500 and 600 may be performed separately or together.

In some variations of card frame 101, electric circuit 205 includes a processing circuit for implementing a smart card frame. For example, electric circuit 205 may comprise computing device 700 as illustrated in FIG. 7. Computing device 700 may include a processor 703 for controlling overall operation of the computing device 700 and its associated components, input/output device 709, memory 715, and/or communication interface 723. A data bus may interconnect processor(s) 703, memory 715, I/O device 709, and/or communication interface 723.

Input/output (I/O) device 709 may include a port (e.g., contacts, conductors, modem) through which the computing device 700 may receive input, such as for initial programming, receiving authentication keys, etc., prior to being issued to a cardholder.

Software may be stored within memory 715 to provide instructions to processor 703 allowing computing device 700 to perform various actions. For example, memory 715 may store software used by the computing device 700, such as an operating system 717, application programs 719, and/or an associated internal database 721. The various hardware memory units in memory 715 may include volatile and nonvolatile media implemented in any method or technology for storage of information such as computer-readable instructions, data structures, program modules, or other data. Memory 715 may include one or more physical persistent memory devices and/or one or more non-persistent memory devices. Memory 715 may include, but is not limited to, RAM, ROM, electronically erasable programmable read only memory (EEPROM), flash memory or other memory technology that may store information and that may be accessed by processor 703.

Communication interface 723 may include one or more transceivers, amplifiers, digital signal processors, and/or additional circuitry and software for communicating via antennas 201 and/or 301 and/or contacts 211. Communication interface 723 may also include near field communication (NFC) capabilities, short-range wireless communication capabilities (e.g., Bluetooth®), wireless communication capabilities (e.g., Wi-Fi), or any combination thereof. Communication interface 723 may include some or all of the features of electric circuit 400 illustrated in FIG. 4.

Computing device 700 may further include a power circuit 730, which may be the same as power circuit 403 described with respect to FIG. 4 for converting radio frequency electromagnetic signals to electrical power for powering computing device 700 and transaction card 102 as previously described.

Processor 703 may include a single central processing unit (CPU), which may be a single-core or multi-core processor, or may include multiple CPUs. Processor(s) 703 and associated components may allow the computing device 700 to execute a series of computer-readable instructions to perform some or all of the processes described herein. Although not illustrated in FIG. 7, various elements within memory 715 or other components in computing device 700, may include one or more caches, for example, CPU caches used by the processor 703, page caches used by the operating system 717, and/or database caches used to cache content from database 721. For embodiments including a CPU cache, the CPU cache may be used by one or more processors 703 to reduce memory latency and access time. A processor 703 may retrieve data from or write data to the CPU cache rather than reading/writing to memory 715, which may improve the speed of these operations.

Although various components of computing device 700 are described separately, functionality of the various components may be combined and/or performed by a single component and/or multiple computing devices in communication. And although various components of computing device 700 are described separately from the various components of electric circuit 400, these various components and their functionality may be combined and/or performed by a single component and/or multiple computing devices in communication.

The inclusion of a processing circuit, such as computing device 700, greatly expands the capabilities of card frame 101, such as: enabling it to work as a transaction card on its own (without transaction card 102 secured in the receptacle), providing security measures limiting the use of the card frame to only certain paired transaction cards 102, and enabling the card frame to take on multiple different identities, depending upon whether a transaction card is inserted in the receptacle and depending upon which of multiple different transaction cards is inserted into the receptacle.

Figure 8:
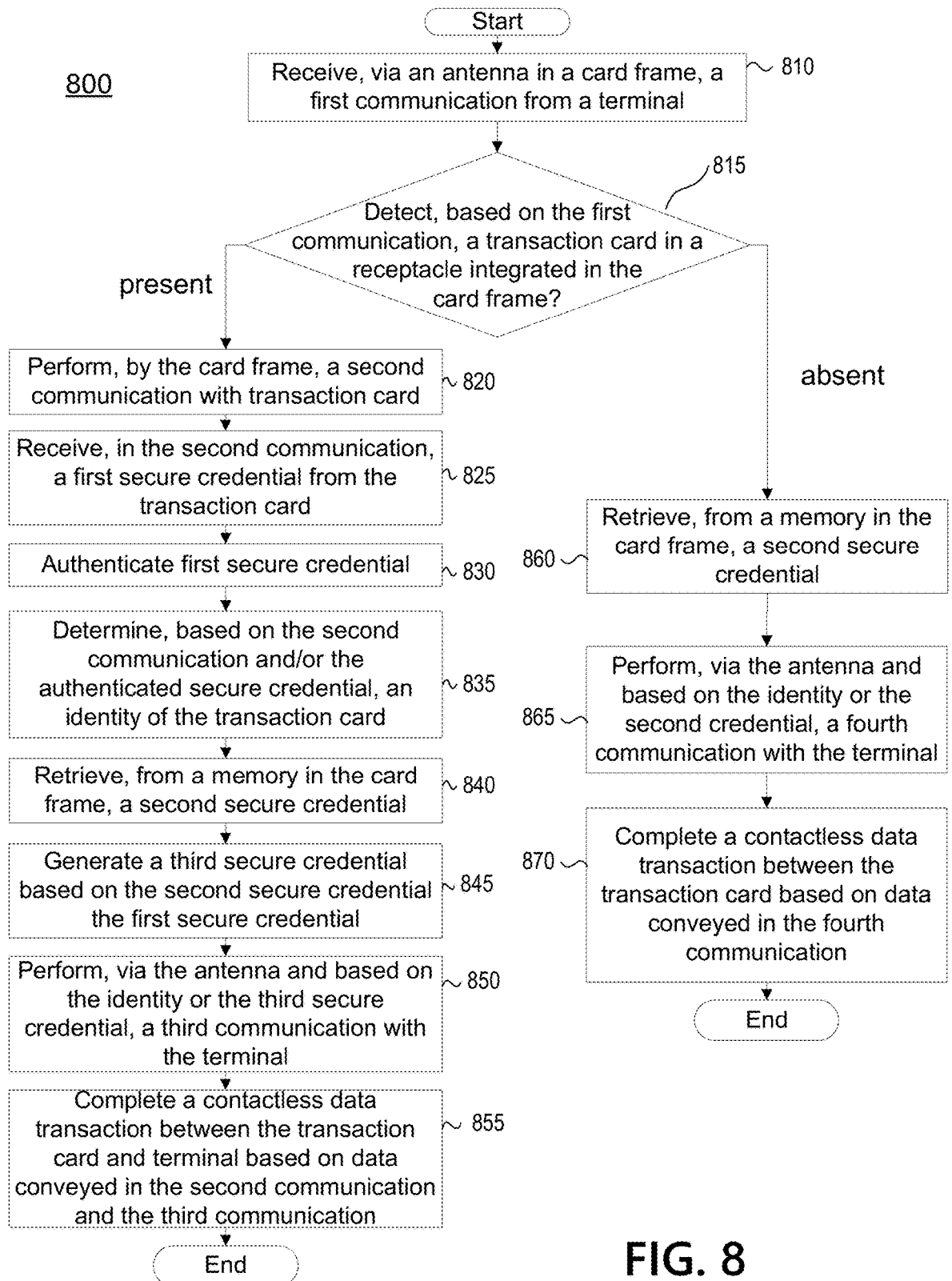
FIG. 8 illustrates a flow chart of a process for using a transaction card assembly to perform a data transaction according to one or more aspects of the disclosure.

FIG. 8 illustrates a method 800 for using the card frame 101 that includes a processing circuit, such as computing device 700. Process 800 begins with step 810, in which the card frame 101 receives, via antenna 201, a first communication from a terminal, such as card reader 120. The first communication may communicate data (in either or both directions) and be the beginning or part of a data transaction (e.g., a contactless transaction, NFC transaction) with the terminal. In step 815 the card frame 101 detects, based on the first communication, whether a transaction card 102 is secured in receptacle 103. The detection may, for example, be based on a communication between the transaction card 102 and computer device 700, or may be based on a measurement of an electrical parameter (e.g., detection of a resistance at contacts 211). In response to detecting that the transaction card 102 is present in the receptacle 103, steps 820-855 may be performed to complete a contactless data transaction based on the combination of card frame 101 and transaction card 102 together as card assembly 100. In response to detecting that the transaction card 102 is absent from the receptacle 103, steps 860-875 may be performed to complete a contactless data transaction based on the card frame 101 alone.

If transaction card 102 is present in the receptacle 103, card frame 101 in step 820, performs a second communication with transaction card 102. The second communication may convey data (in either or both directions) for performing the data transaction with the terminal. The card frame 101 may in step 825 receive in the second communication, a first secure credential from transaction card 102, which may be unique to transaction card 102, and may in step 830 authenticate the first secure credential, for example, using a decryption and/or authentication application executed in computing device 700. In step 835, the card frame 101 (for example, using computing device 700) may determine, based on the second communication and/or the authenticated secure credential, an identity of transaction card 102.

In step 840 the computing device 700 may (optionally) retrieve from a memory (e.g., 715) in the card frame 101, a second secure credential uniquely associated with the card frame 101. Performance of step 840 may be based on confirming that the identity or authenticated secure credential of the transaction card 102 is authorized to be used with the card frame 101. For example, computing device 700 may have stored in memory, a list of one or more identities of different transaction cards authorized to be used with the card frame 101. If the transaction card 102 is not authorized to be used with the card frame 101 (e.g., because transaction card 102 is not in the list), the process may end without completing the data transaction.

In step 845 computing device 700 in the card frame 101 may generate a third secure credential based on the first secure credential and (optionally) based on the second secure credential. The third secure credential may be unique to the combination of the card frame 101 and transaction card 102 (for example, by being derived from the first and second secure credentials). Computing device 700 may be configured to generate multiple different third secure credentials based on the second secure credential and, respectively, multiple different first secure credentials of multiple different transaction cards 102.

In step 850 card frame 101 may perform, via antenna 201 and based on the identity of the transaction card 102 in the receptacle or based the third secure credential, a third communication with the terminal. The performance of steps 845 and/or 850 may be based on or in response to the successful authentication of the first secure credential. The third communication may contain data conveyed in the second communication and additional data (e.g., the third secure credential). In step 855 the card frame 101 may complete a contactless data transaction between the transaction card 102 in the receptacle and the terminal based on data conveyed in the second communication and the third communication. In each of the communications, the data may be conveyed (in either or both directions) and (optionally) encrypted, with computing device 700 performing encryption and decryption of the data.

Returning to step 815, if the transaction card 102 was determined to be absent from the receptacle 103 integrated in the card frame 101, step 860 may be performed in which the card frame 101 retrieves from the memory in the card frame 101, the second secure credential as described above with respect to step 840. In step 865 card frame 101 may perform, via antenna 201 and based on the second secure credential, a fourth communication with the terminal. In this step, the second secure credential is uniquely associated with just the card frame 101 and is distinct from the secure credentials of the transaction cards 102. In step 875 card frame 101 completes a data transaction (e.g., contactless data transaction, NFC transaction) between the card frame 101 and the terminal based on data conveyed (in either or both directions) in the fourth communication. In the fourth communication, the data may be encrypted, with computing device 700 performing encryption and decryption of the data.

With the steps of process 800, the card frame 101 may appear as multiple different transaction cards when performing contactless data transactions, each with a unique identity, that is specific to the card frame 101 alone (with the receptacle 103 empty), or specific to the unique combinations of the card frame 101 and each different transaction card 102 inserted in the receptacle. Moreover, the transaction cards 102 also appear unique with their own respective identities when performing a data transaction without the card frame.

Discussion will now turn to features or characteristics that may be included with the transaction cards and/or card frames discussed herein to enable an individual to more easily locate a transaction card or a card frame and/or to correctly orient and insert a transaction card into a card frame.

The transaction cards and/or card frames described herein may include any number of features or characteristics to aid user interaction with the transaction cards and/or card frames. Specifically, the transaction cards and/or card frames described herein may include any number of visual and/or tactile features that aid an ability of an individual to locate and/or identify a transaction card or card frame in a low lighting environment (e.g., when reaching in a purse or wallet to find a transaction card or card frame). The same features may aid a visually challenged or impaired individual, including a blind individual or a color-blind individual.

The visual and/or tactile features may also aid an individual to properly orient a transaction card with a card frame to ensure the transaction card is properly inserted and secured to the card frame. The visual and/or tactile features make the process of attaching a transaction card to a card frame, or verifying the transaction card is correctly attached to the card frame, quick and easy for an individual, thereby improving the experience of the individual using the card assembly. By aiding an individual's ability to properly align and attach a transaction card to a card frame, any intended mechanical or electrical coupling between the transaction card and the card frame may be realized, thereby allowing the card assembly to be used with a chip card reader to conduct a financial transaction as discussed above.

Figure 9:
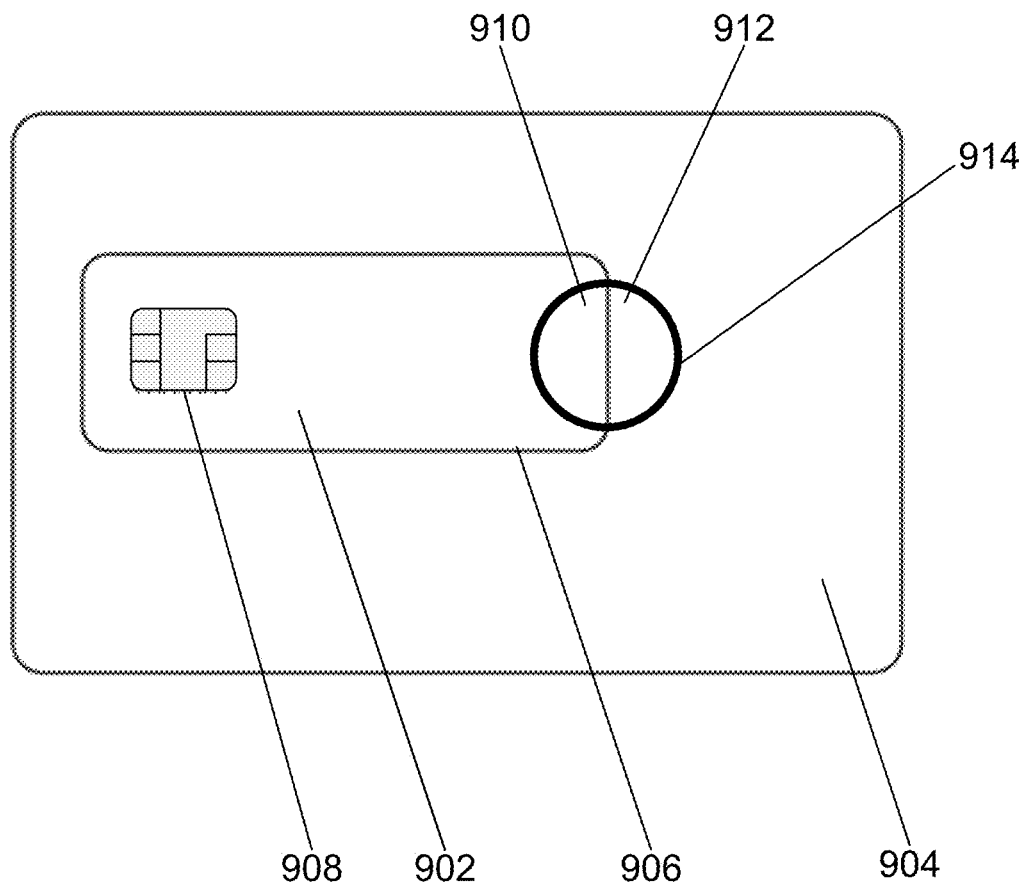
FIG. 9 illustrates a first example of a transaction card and card frame having one or more features to facilitate aligning and securing the transaction card with the card frame.

FIG. 9 illustrates card assembly 900. The card assembly 900 may be substantially the same or similar to any of the card assemblies described herein such as, for example, the card assembly 100. The card assembly 900 may include a transaction card 902, a card frame 904, a receptacle 906, and a computer chip 908. The transaction card 902 may be substantially the same or similar to any of the transaction cards described herein such as, for example, the transaction card 102. The card frame 904 may be substantially the same or similar to any of the card frames described herein such as, for example, the card frame 101. The receptacle 906 may be substantially the same or similar to any of the receptacles described herein such as, for example, the receptacle 103. The computer chip 908 may be substantially the same or similar to any of the computer chips described herein such as, for example, the computer chip 203.

The card assembly 900 may include one or more features to aid an individual in aligning and securing the transaction card 902 to the card frame 904 in a correct manner (e.g., to properly secure or resecure the transaction card 902 within the receptacle 906 of the card frame 904). The one or more features may be positioned or located on the transaction card 902 and/or the card frame 904. The transaction card 902 may be correctly positioned within the receptacle 906 when the computer chip 908 is securely positioned so that the computer chip 908 may be engaged by a chip card reader or card reader (e.g., the card reader 120), allowing a financial transaction to be conducted using the computer chip 908 via the chip card reader. Proper alignment and/or orientation of the transaction card 902 and the card frame 904 may also ensure that any electrical connections or mechanical coupling between the transaction card 902 and the card frame 904 are properly made.

Features that may be used to guide an individual to properly secure or resecure the transaction card 902 to the card frame 904 may include a first alignment region 910 and a second alignment region 912. The first alignment region 910 may be positioned or located on any portion or part of the transaction card 902. The second alignment region 912 may be positioned or located on any portion or part of the card frame 904.

As shown in FIG. 9, the first alignment region 910 may be positioned or located adjacent to an edge or periphery of the transaction card 902 and the second alignment region 912 may be positioned or located adjacent to an edge or periphery of the card frame 904 (e.g., a corresponding or adjacent edge or periphery of the card frame 904 relative to the transaction card 902). The first alignment region 910 may form a first portion (e.g., a first half) of a shape 914 and the second alignment region 912 may form a second portion (e.g., a complementary portion or the other half) of the shape 914. As shown in FIG. 9, the shape 914 may be a circle. In various embodiments, the first alignment region 910 and the second alignment region 912 may be positioned on surfaces of the transaction card 902 within the card frame 904, respectively. For example, the first alignment region 910 and the second alignment region 912 may be printed on top or outside surfaces of the transaction card 902 within the card frame 904. In various embodiments, the, the first alignment region 910 and the second alignment region 912 may be customized or user-selected shapes or designs (e.g., a picture or shape selected by the user).

When the transaction card 902 is properly oriented (e.g., aligned and/or secured in the receptacle 906) with the card frame 904, the first alignment region 910 and the second alignment region 912 may form a complete or full shape—for example, a complete or full version of the shape 914, which is a circle. The first and second alignment regions 910 and 912 may be colored and/or textured to ensure the shape 914 is pronounced and visually clear or distinguishable to an individual (e.g., the first and second alignment regions 910 and 912 may be colored in a manner differently from a remainder of the transaction card 902 and/or a remainder of the card frame 904). Together, the first and second alignment regions 910 and 912 may be used by an individual to determine an orientation for positioning the transaction card 902 within the receptacle 906 in a manner that secures the transaction card 902 within the card frame 904 and/or allows the computer chip 908 to be read by a chip or card reader when the card assembly 900 is inserted into the chip or card reader (e.g., ensures that the computer chip 908 is oriented at the correct end and face of the card frame 904).

In general, the first and second alignment regions 910 and 912 may be considered to form an alignment indicator (or orientation indicator), when the first and second alignment regions 910 and 912 are aligned next to one another. That is, when the first alignment region 910 is positioned adjacent to the second alignment region 912, the alignment indicator is formed, thereby indicating to an individual that the transaction card 902 is properly positioned within the card frame 902. As shown in FIG. 9, the alignment indicator is the shape 914. The alignment indicator formed by the first and second alignment regions 910 and 912 may be of any size, shape, color, or design. An individual may manipulate the transaction card 902 and the card frame 904 to align the first and second alignment regions 910 and 912 to form the alignment indicator. Until the alignment indicator is formed, the individual may determine that an orientation and/or alignment between the transaction card 902 and the card frame 904 is not correct or complete (and as such, the combined card assembly 900 is not in condition to conduct a financial transaction when inserted into a chip card reader and/or that mechanical and/or electrical coupling between the transaction card 902 and the card frame 904 is not correct or complete).

When the first and second alignment regions 910 and 912 are aligned to form the alignment indicator, an individual may determine or conclude that the combined card assembly 900 is ready or in condition to be able to conduct a financial transaction when inserted into a chip card reader. As described herein, the transaction card 900 may be used to conduct a contactless financial transaction using the computer chip 908. In various embodiments, the computer chip 908 may facilitate a contactless financial transaction when secured in the receptacle 906 (to form the combined card assembly 900) or when not secured in the receptacle (e.g., when the transaction card 902 is used alone). In various embodiments, the transaction card 902 alone may be incompatible with a card reader or chip card reader (e.g., due to a form factor of the transaction card 902), and may require to be secured in the receptacle 906 (to form the combined card assembly 900) to conduct a transaction.

The first and second alignment regions 910 and 912 may include any number of features or characteristics that aid an individual to locate and orient the first and second alignment regions 910 and 912. These features or characteristics may vary by visual appearance, including: size, shape, color, gloss, reflectivity, transparency, three-dimensionality (e.g., as in a hologram, or raised or recessed surface), texture, illumination, and location. These features or characteristics may also vary by feel or tactile qualities, including: roughness, texture, three-dimensionality (raised or recessed surface). Some of these characteristic (e.g., texture) may provide both visual and tactile distinctions. As a first example, the first and second alignment regions 910 and 912 may together form any shape (e.g., a circle, a square, a rectangle, etc.). The first alignment region 910 may form any portion of the combined shape (e.g., ⅓ of a complete circle) and the second alignment region may form a complementary portion of the combined shape (e.g., ⅔ of a circle). Accordingly, the alignment indicator formed by the first and second alignment regions 910 and 912 may be a complete shape.

As another example, the first and second alignment regions 910 and 912 may together form any textual logo (e.g., a slogan or name of a financial institution or bank). The first alignment region 910 may form any portion of the combined textual logo (e.g., ⅓ of a complete textual logo) and the second alignment region may form a complementary portion of the combined textual logo (e.g., ⅔ of the complete textual logo). Accordingly, the alignment indicator formed by the first and second alignment regions 910 and 912 may be a complete textual logo.

As another example, the first and second alignment regions 910 and 912 may together form any graphical logo (e.g., a company symbol). The first alignment region 910 may form any portion of the combined graphical logo (e.g., ⅓ of a complete graphical logo) and the second alignment region may form a complementary portion of the combined graphical logo (e.g., ⅔ of the complete graphical logo). Accordingly, the alignment indicator formed by the first and second alignment regions 910 and 912 may be a complete graphical logo.

Additionally, the first and second alignment regions 910 and 912 may be positioned or located along any adjacent edges of the transaction card 902 and the card frame 904, so as to be adjacent (e.g., touching, or in close proximity) to one another when the transaction card 902 and the card frame 904 are properly oriented to one another. Further, the transaction card 902 may include multiple alignment regions, each paired to a complementary alignment region of the card frame 904.

As another example of features that may be used to locate the first and second alignment regions 910 and 912, the first alignment region 910 may include a first raised region. The raised region of the first alignment region 910 may be a region of the transaction card 902 that is thicker than a remaining region (or majority region) of the transaction card 902 (or a portion of card assembly 900). The first raised region may be, for example, a bump. The second alignment region 912 may include a second raised region. The raised region of the second alignment region 912 may be a region of the card frame 904 that is thicker than a remaining region (or majority region) of the card frame 904 (or a portion of card assembly 900). The second raised region may be also be a bump and may be complementary to the first raised region such that the first raised region of the first alignment region 910 and the second raised region of the second alignment region 912 form a substantially complete or smooth shape or region.

As another example, the first alignment region 910 may include a first recessed region. The recessed region of the first alignment region 910 may be a region of the transaction card 902 that is thinner than a remaining region (or majority region) of the transaction card 902 (or a portion of card assembly 900). The first raised region may be an indentation for example. The second alignment region 912 may include a second recessed region. The recessed region of the second alignment region 912 may be a region of the card frame 904 that is thinner than a remaining region (or majority region) of the card frame 904 (or a portion of card assembly 900). The second recessed region may be also be an indentation and may be complementary to the first recessed region such that the first recessed region of the first alignment region 910 and the second recessed region of the second alignment region 912 form a substantially complete or smooth shape or region.

As another example, the first alignment region 910 may include a first tactile region. The first tactile region may have a texture that is different from a remaining portion of the transaction card 902. For example, the transaction card 910 may be substantially flat and smooth to the touch, while the first tactile region of the first alignment region 910 may have a texture that is different (e.g., a texture that is rough or gritty like sandpaper). Likewise, the second alignment region 912 may include a second tactile region that may have a texture that is different from a remaining portion of the card frame 904. For example, the card frame 904 may be substantially flat and smooth to the touch, while the second tactile region of the second alignment region 912 may have a texture that is different (e.g., a texture that is rough or gritty like sandpaper). Textures of the first and second alignment regions 910 and 912 may be substantially the same (e.g., rough or gritty) and may be in contrast to a texture of a remaining portion of the card assembly 900 (which may be substantially smooth). Textures of the first and second alignment regions 910 and 912 may be directional, so that they have a first texture when brushed in one direction, and a second texture when brushed in a second direction. Textures of the first and second alignment regions 910 and 912 may have the same textures in the same directions when the transaction card 902 and card frame 904 are correctly assembled together.

Different textures may be formed within the first and second alignment regions 910 and 912 in a variety of manners. For example, textures may be formed within the first and second alignment regions 910 and 912 by embossing or debossing each region (e.g., in a complementary manner in each region).

As another example, the first alignment region 910 may be transparent with a remaining portion of the transaction card 902 being opaque. Likewise, the second alignment region 912 may be transparent with a remaining portion of the card frame 904 being opaque. The first and second alignment regions 910 and 912 may also be positioned together on the same sides of the transaction card 902 and the card frame 904, respectively. For example, the first and second alignment regions 910 and 912 may each be positioned on front surfaces of the transaction card 902 and the card frame 904, respectively, or the first and second alignment regions 910 and 912 may each be positioned on back surfaces of the transaction card 902 and the card frame 904, respectively.

The first and second alignment regions 910 and 912 may be colored in any manner to aid individuals with visual impairments, such as colorblindness. As an example, the first and second alignment regions 910 and 912 may be colored (e.g., using yellow and/or blue colors) in any manner (e.g., lines, strips, dots, etc.) and the remaining portions of the transaction card 902 and card frame 904 may be colored with a different color (e.g., using blue and/or yellow) that are distinguishable by individuals who are colorblind. Any coloring (including patterns or shading) may be used to color any portion of the first and second alignment regions 910 and 912.

In general, the transaction card 902 and the card frame 904 may include any number of alignment regions that complement one another so as to inform how to align and orient the transaction card 902 with the card frame 904. Further, each alignment region may be varied in different manners as described herein by color, shape, size, tactile feature, and placement, on the card assembly 900. FIGS. 10-14 illustrate example alignment regions that may be used with the card assembly 900.

Figure 10:
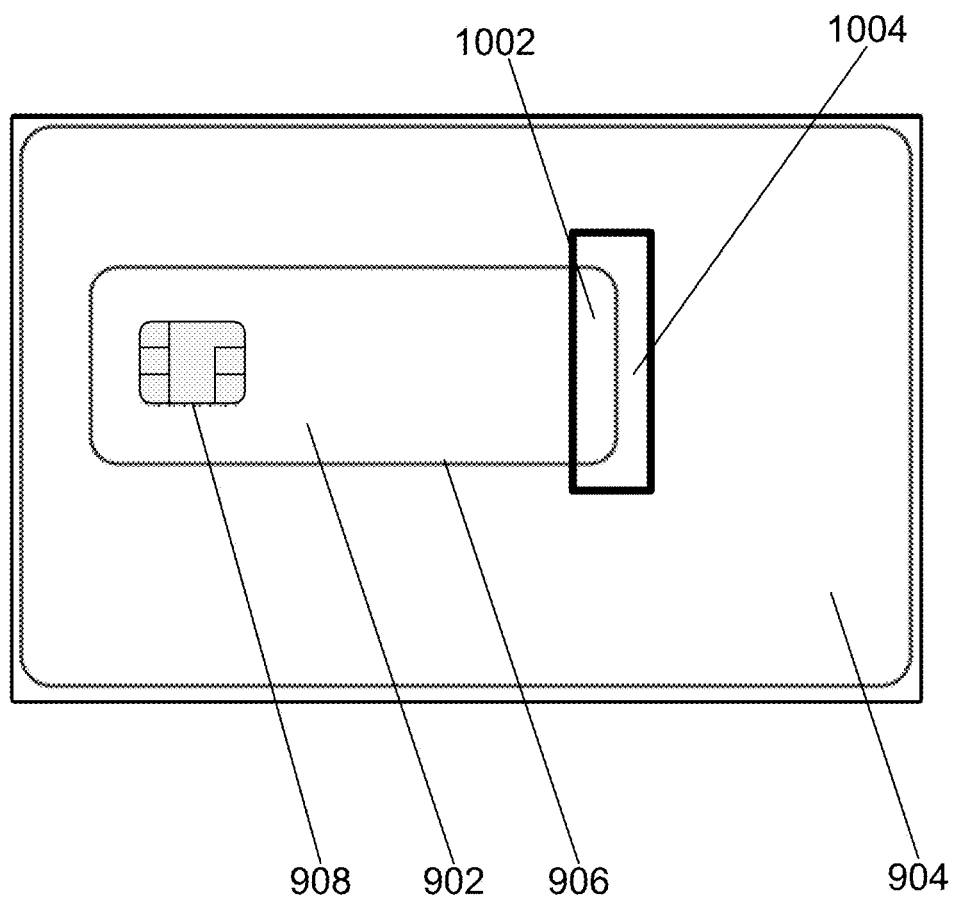
FIG. 10 illustrates a second example of a transaction card and a card frame having one or more features to facilitate aligning and securing the transaction card with the card frame.

FIG. 10 illustrates card assembly 900 having first alignment region 1002 and second alignment region 1004. The first alignment region 1002 is positioned on the transaction card 902 and the second alignment region 1004 is positioned on the card frame 904. As shown, when aligned, the first and second alignment regions 1002 and 1004 form a rectangle shape (as an alignment indicator).

Figure 11:
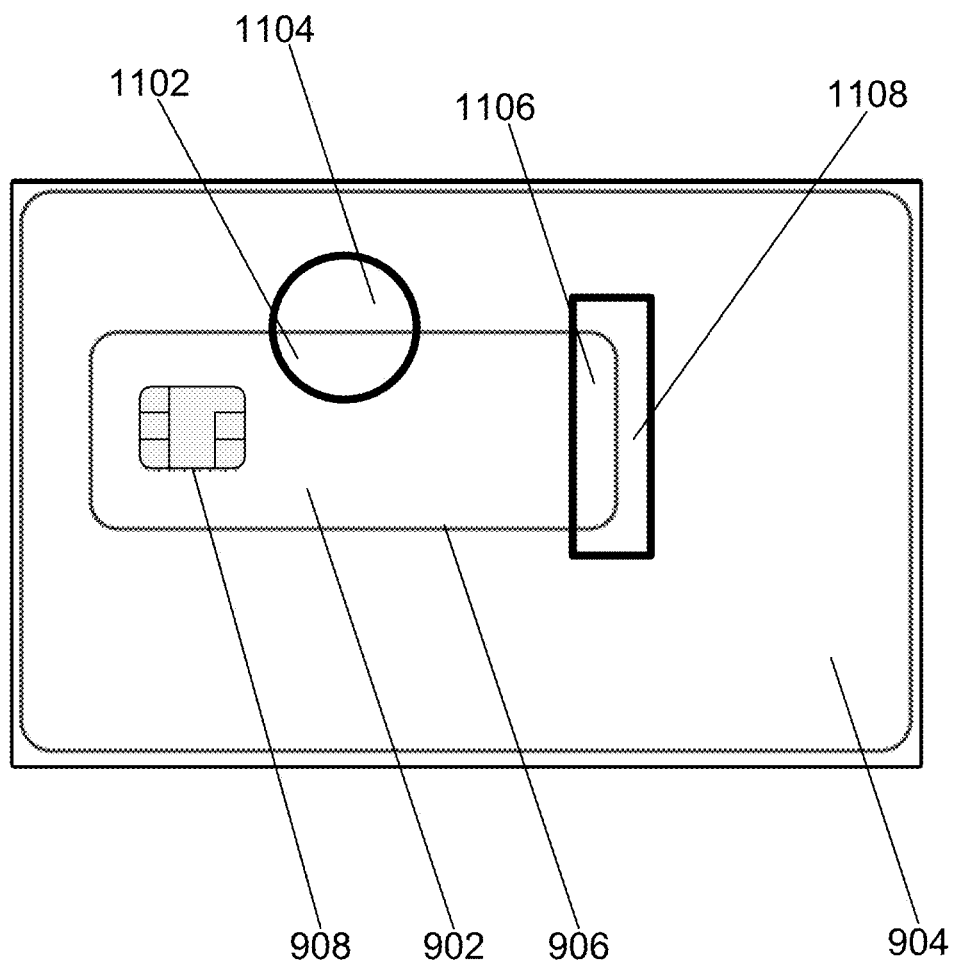
FIG. 11 illustrates a third example of a transaction card and a card frame having one or more features to facilitate aligning and securing the transaction card with the card frame.

FIG. 11 illustrates card assembly 900 having first alignment region 1102, a second alignment region 1104, a third alignment region 1106, and a fourth alignment region 1108. The first and third alignment regions 1102 and 1106 are positioned on the transaction card 902. The second and fourth alignment regions 1104 and 1108 are positioned on the card frame 904. The first and second alignment regions 1102 and 1104 form a first alignment indicator. The third and fourth alignment regions 1106 and 1108 form a second alignment indicator. As shown, when aligned, the first and second alignment regions 1102 and 1104 form a circle shape (as the first alignment indicator) and the third and fourth alignment regions 1106 and 1108 form a rectangle shape (as the second alignment indicator). FIG. 11 therefore shows an example of the card assembly including more than one alignment indicator.

Figure 12:
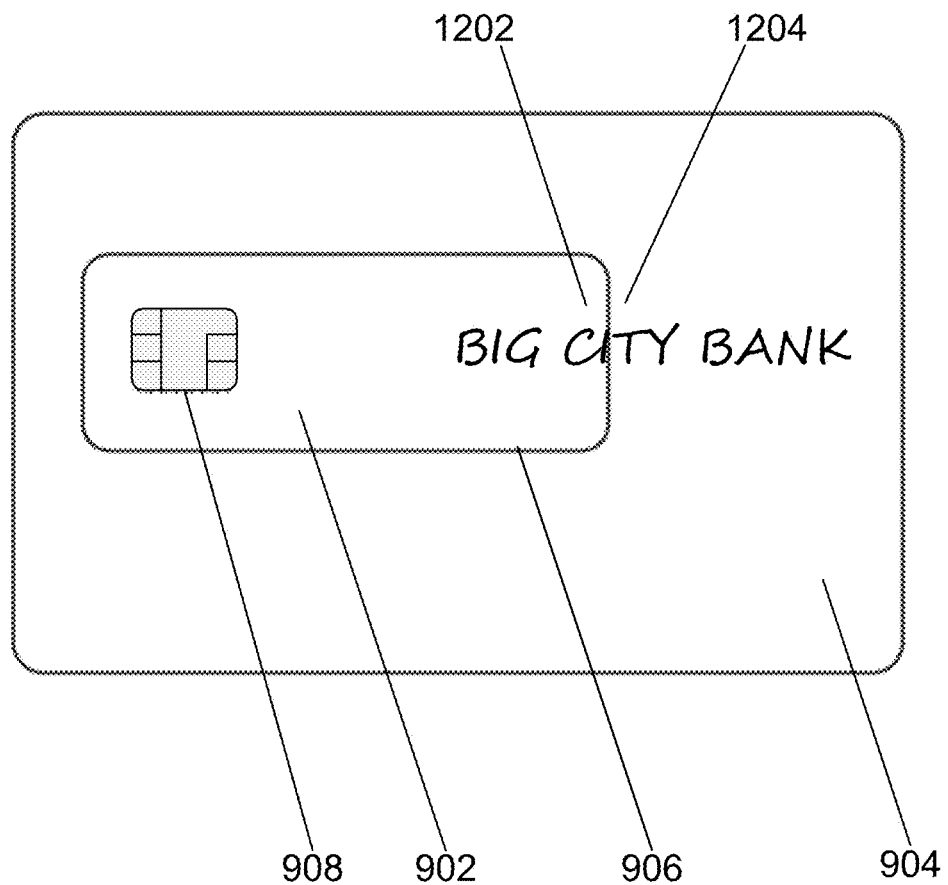
FIG. 12 illustrates a fourth example of a transaction card and a card frame having one or more features to facilitate aligning and securing the transaction card with the card frame.

FIG. 12 illustrates card assembly 900 having first alignment region 1202 and second alignment region 1204. The first alignment region 1202 is positioned on the transaction card 902 and the second alignment region 1204 is positioned on the card frame 904. As shown, when aligned, the first and second alignment regions 1202 and 1204 form a textual logo (as an alignment indicator). Specifically, when aligned, the first and second alignment regions 1202 and 1204 form text that reads "Big City Bank," with the first alignment region 1202 including the text "Big Ci" and the second alignment region 1204 including the text "ty Bank."

Figure 13:
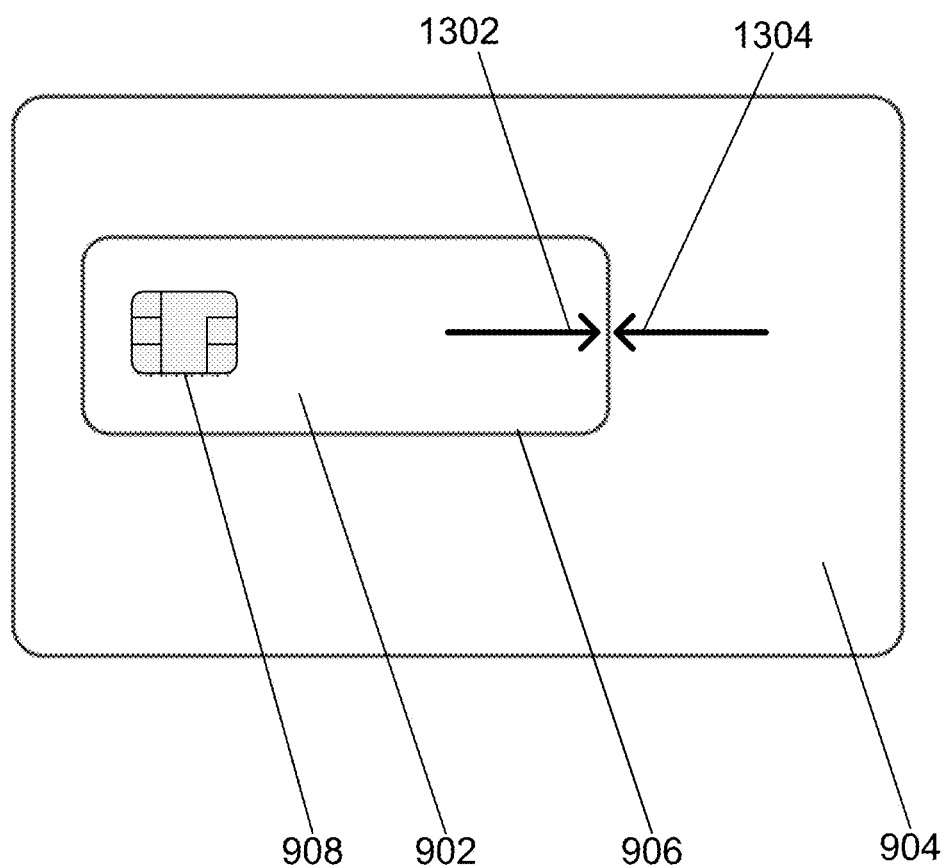
FIG. 13 illustrates a fifth example of a transaction card and a card frame having one or more features to facilitate aligning and securing the transaction card with the card frame.

FIG. 13 illustrates card assembly 900 having first alignment region 1302 and second alignment region 1304. The first alignment region 1302 is positioned on the transaction card 902 and the second alignment region 1304 is positioned on the card frame 904. As shown, when aligned, the first and second alignment regions 1302 and 1304 form two arrows pointing to one another (as an alignment indicator). Specifically, the first alignment region 1302 is a first arrow pointing to an edge of the transaction card 902 and the second alignment region 1302 is a second arrow pointing to an edge of the card frame 904 (e.g., an internal edge of the card frame 902 adjacent the receptacle 906).

Figure 14:
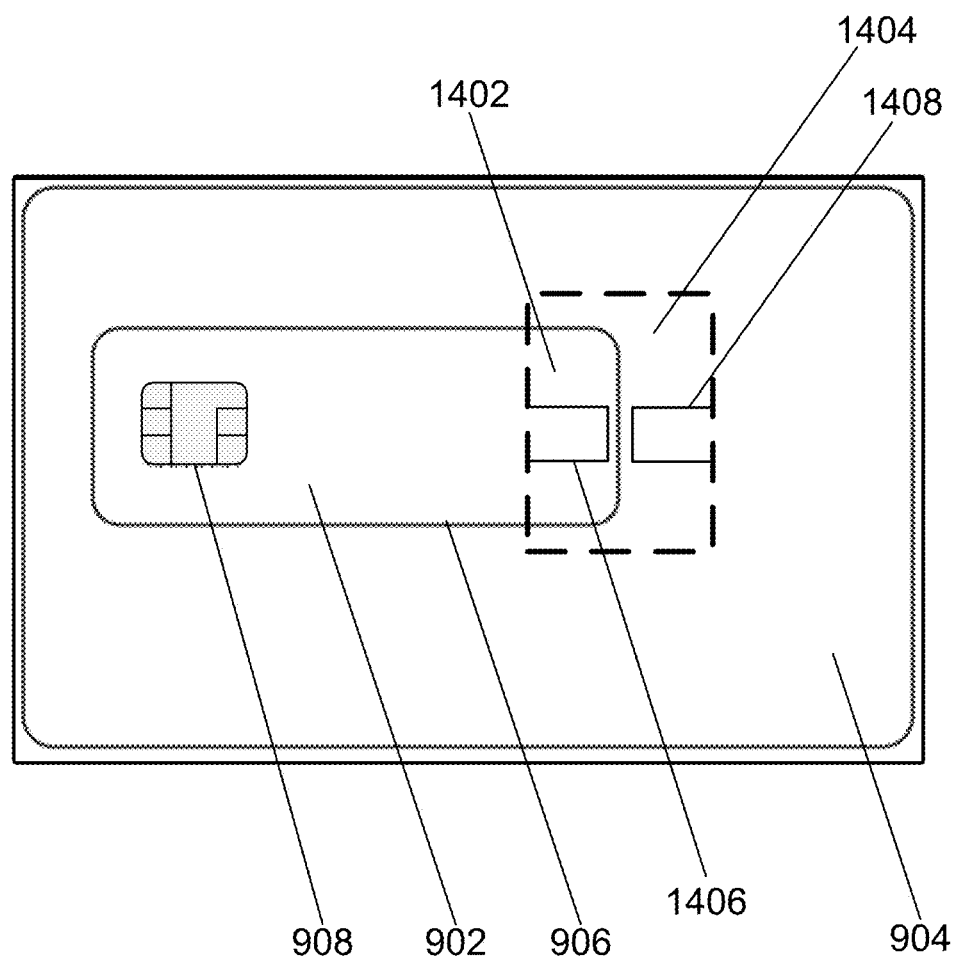
FIG. 14 illustrates a sixth example of a transaction card and a card frame having one or more features to facilitate aligning and securing the transaction card with the card frame.

FIG. 14 illustrates card assembly 900 having first alignment region 1402 and second alignment region 1404 (identified with a dashed line). The first alignment region 1402 is positioned on the transaction card 902 and the second alignment region 1404 is positioned on the card frame 904. The first alignment region 1402 may be substantially transparent, while the remaining portion of the transaction card 902 may be opaque. As such, the first alignment region 1402 may be conspicuous and easily noticeable by an individual. Similarly, the second alignment region 1404 may be substantially transparent, while the remaining portion of the card frame 904 may be opaque. As such, the second alignment region 1404 may also be conspicuous and easily noticeable by an individual. As shown, when aligned, the first and second alignment regions 1202 and 1204 a clear (e.g., transparent) rectangle shape (as an alignment indicator).

Overall, the alignment regions described herein may use any combination of characteristics or features to distinguish the regions from other portions of the card assembly (e.g., the card assembly 900). For example, the alignment regions may use a combination of tactile features, shape features, and color features (e.g., the alignment regions may together form a red circle as an alignment indicator that is also rough to the touch compared to the rest of the surface of the card assembly).

In various embodiments, portions of the card assembly 900 may be transparent so as to expose wires or other components (e.g., electrical components) contained within the transaction card 902 or the card frame 904. The wires or components may be colored in a manner to indicate a manner of correct orientation to a user (e.g., using colors accessible to a color-blind individual). For example, with reference to FIG. 14, the first alignment region 1402 may include a first wire 1406 contained within the transparent card 902 while the second alignment region 1404 may include a second wire 1408 contained within the card frame 904. The first and second wires 1406 and 1408 may be colored in a manner as to be distinguishable within the transparent regions. The first and second wires 1406 and 1408 may be arranged so as to indicate a proper orientation of the transaction card 902 and the card frame 904 when inserted properly.

Figure 15:
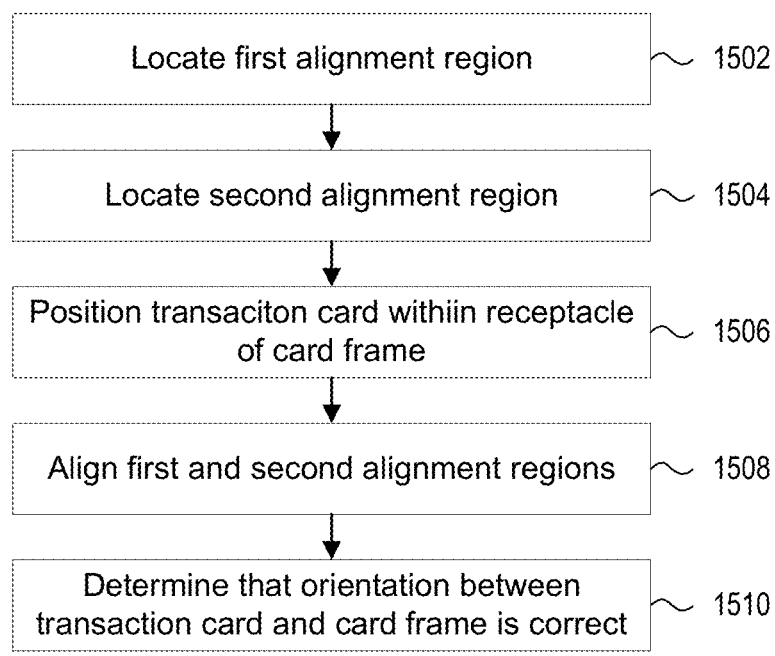
FIG. 15 illustrates an example method for securing a transaction card to a card frame according to one or more aspects of the disclosure.

FIG. 15 illustrates an example method 1500 for securing a transaction card to a card frame. The method 1500 may be used by an individual to ensure the transaction card is secured to the card frame in a proper orientation. Proper orientation of the transaction card within the card frame allows the combined card assembly to be used to conduct a financial transaction using a computer chip on the transaction card via a chip card reader. Proper orientation of the transaction card within the card frame also ensures that the transaction card is mechanically and/or electrically coupled to the card frame as intended. The method 1500 may be implemented by any of the card assemblies described herein such as, for example, the card assembly 100 or the card assembly 900.

At step 1502, a first alignment region of a transaction card may be located or determined. The transaction card may include a computer chip or integrated circuit configured to conduct a financial transaction in a contactless manner or via a chip card reader. The first alignment region may have any number of features or characteristics to enable the first alignment region to be distinguished from a remaining portion of the transaction card. For example, the first alignment region may form a first portion of an alignment indicator and may be distinguishable by color, shape, size, design, or feel, as described herein.

At step 1504, a second alignment region of a card frame may be located or determined. The card frame may include a receptacle configured to secure, enable removal of, and resecure the transaction card in the card frame. As with the first alignment region, the second alignment region may have any number of features or characteristics to enable the second alignment region to be distinguished from a remaining portion of the card frame. For example, the second alignment region may form a second portion of an alignment indicator and may be distinguishable by color, shape, size, design, or feel, as described herein.

Together, the first and second alignment regions may form an entirety of the alignment indicator. The first and second alignment regions may include the same features provide matching characteristics that may be used to locate the first and second alignment regions. As an example, the first alignment region may provide a first tactile region that has a feel to the touch that matches a second tactile region provided by the second alignment region, with the feel to the touch different from and therefore easily distinguishable from a remainder of the card assembly.

Locating the first alignment region may be based on a first texture of the first alignment region and locating the second alignment region may be based on a second texture of the second alignment region. The first and second textures may match and may be different from a texture of a remaining portion of the card assembly.

Locating the first alignment region may be based on a first color of the first alignment region and locating the second alignment region may be based on a second color of the second alignment region. The first and second color may match and may be different from a color of a remaining portion of the card assembly.

At step 1506, the transaction card may be positioned within the receptacle of the card frame to form the card assembly. The transaction card may be positioned based on locating the first alignment region and the second alignment region.

At step 1508, the first alignment region may be aligned with the second alignment region. The first alignment region may be aligned with the second alignment region as the transaction card is being positioned within the receptacle. The transaction card may be positioned with the receptacle in order for the first and second alignment regions to form a combined alignment indicator or region as described herein.

Aligning the first alignment region with the second alignment region may be based on aligning a first portion of a combined alignment indicator with a second portion of the combined alignment indicator. As an example, aligning the first alignment region with the second alignment region may be based on aligning a first portion of a shape, a textual logo, or a graphical logo of the first alignment region with a second portion of the shape, the textual logo, or the graphical logo of the second alignment region to form a complete shape, a complete textual logo, or a complete graphical logo, as described herein. The first portion of the combined alignment indicator and the second portion of the combined alignment indicator may indicate correct orientation and/or alignment when positioned adjacent to one another (e.g., when touching or in close contact).

At step 1510, an orientation of the transaction card with the card frame may be determined to be correct. The determination may be based on aligning the first alignment region with the second alignment region (e.g., based on the first and second alignment regions forming a known combined alignment indicator or region).

After properly orienting and securing the transaction card within the card frame, the combined card assembly may be used to conduct a contactless financial transaction via the integrated circuit or computer chip of the transaction card. A financial transaction may also be conducted via a chip card reader. Specifically, the card assembly may be inserted into a chip card reader and a financial transaction may be conducted via the integrated circuit or computer chip of the transaction card.

The method 1500 allows an individual or user to quickly locate a transaction card and card frame, and to quickly and/or correctly insert and secure the transaction card into the receptacle of the card frame in a proper manner that allows the card assembly to be used to conduct financial transactions. The method 1500 improves the user's experience with the card assembly by reducing any complexity associated with manipulating the transaction card to be properly aligned with the card frame, and increases a likelihood that intended mechanical and/or electrical coupling between the transaction card and the card frame is made as intended.

One or more aspects discussed herein may be embodied in computer-usable or readable data and/or computer-executable instructions, such as in one or more program modules, executed by one or more computers or other devices as described herein. Generally, program modules include routines, programs, objects, components, and data structures that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described. Thus, embodiments of the present disclosure should be considered in all respects as illustrative and not restrictive.

What is claimed is:

1. A card assembly, comprising:
a transaction card comprising an integrated circuit and a first alignment region positioned on a surface of the transaction card; and
a card frame comprising a receptacle and a second alignment region positioned on a surface of the card frame,
wherein the receptacle is configured to secure, enable removal of, and resecure the transaction card in the card frame; and
wherein, when the transaction card is secured in the receptacle, the first alignment region is aligned with the second alignment region to form a combined alignment region to indicate a correct orientation of the transaction card with the card frame.

2. The card assembly of claim 1, wherein the integrated circuit is configured to perform a contactless financial transaction.

3. The card assembly of claim 1, wherein the first alignment region comprises a first portion of a shape and the second alignment region forms a second portion of the shape.

4. The card assembly of claim 1, wherein the first alignment region comprises a first portion of a textual logo and the second alignment region forms a second portion of the textual logo.

5. The card assembly of claim 1, wherein the first alignment region comprises a first portion of a graphical logo and the second alignment region forms a second portion of the graphical logo.

6. The card assembly of claim 1, wherein the first alignment region comprises a first raised region, relative to a thickness of the transaction card, and the second alignment region comprises a second raised region, relative to a thickness of the card frame.

7. The card assembly of claim 1, wherein the first alignment region comprises a first recessed region, relative to a thickness of the transaction card, and the second alignment region comprises a second recessed region, relative to a thickness of the card frame.

8. The card assembly of claim 1, wherein:
the first alignment region comprises a first tactile region, the first tactile region having a first texture different from a texture of a remaining portion of the transaction card; and
the second alignment region comprises a second tactile region, the second tactile region having a second texture different from a texture of a remaining portion of the card frame.

9. The card assembly of claim 8, wherein the first texture and the second texture are substantially the same.

10. The card assembly of claim 1, wherein the first alignment region comprises a first transparent region and the second alignment region comprises a second transparent region.

11. The card assembly of claim 1, wherein the first alignment region comprises a first embossed region and the second alignment region comprises a second embossed region.

12. The card assembly of claim 1, wherein the first alignment region comprises a first debossed region and the second alignment region comprises a second debossed region.

13. The card assembly of claim 1, wherein the first alignment region is positioned on a periphery of the surface of the transaction card and the second alignment region is positioned on a periphery of the surface of the card frame.

14. The card assembly of claim 1, wherein the correct orientation comprises the integrated circuit positioned to be engaged by a chip reader when the card assembly is inserted into a chip reader terminal.

15. The card assembly of claim 1, wherein the combined alignment region comprises a combined shape, textual logo, or graphical logo.

16. A method comprising:
- locating a first alignment region positioned on a surface of a transaction card, the transaction card comprising an integrated circuit;
- locating a second alignment region positioned on a surface of a card frame, the card frame comprising a receptacle configured to secure, enable removal of, and resecure the transaction card in the card frame;
- positioning, based on locating the first alignment region and the second alignment region, the transaction card within the receptacle of the card frame to form a card assembly;
- aligning the first alignment region with the second alignment region; and
- determining, based on aligning the first alignment region with the second alignment region, that an orientation of the transaction card with the card frame is correct.

17. The method of claim 16, further comprising:
- conducting a contactless financial transaction via the integrated circuit of the transaction card.

18. The method of claim 16, wherein locating the first alignment region comprises detecting a first texture of the first alignment region, and wherein locating the second alignment region comprises detecting a second texture of the second alignment region.

19. The method of claim 16, wherein locating the first alignment region comprises detecting a first color of the first alignment region, and wherein locating the second alignment region comprises detecting a second color of the second alignment region.

20. The method of claim 16, wherein aligning the first alignment region with the second alignment region comprises aligning a first portion of a shape, a textual logo, or a graphical logo of the first alignment region with a second portion of the shape, the textual logo, or the graphical logo of the second alignment region to form a complete shape, a complete textual logo, or a complete graphical logo.

* * * * *